United States Patent
Nash et al.

(10) Patent No.: US 11,835,423 B2
(45) Date of Patent: *Dec. 5, 2023

(54) PIPELINE LEAK DETECTION APPARATUS, AND METHODS THEREOF

(71) Applicant: Professional Flexible Technologies, Inc., Katy, TX (US)

(72) Inventors: Michael David Nash, Katy, TX (US); Stuart Mitchell, Katy, TX (US)

(73) Assignee: Professional Flexible Technologies, Inc., Katy, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,973

(22) Filed: Apr. 29, 2022

(65) Prior Publication Data

US 2022/0260448 A1     Aug. 18, 2022

Related U.S. Application Data

(63) Continuation of application No. 16/944,779, filed on Jul. 31, 2020, now Pat. No. 11,359,989, which is a continuation-in-part of application No. 16/532,371, filed on Aug. 5, 2019, now abandoned.

(51) Int. Cl.
*G01M 3/18* (2006.01)
*G01M 3/40* (2006.01)
*F17D 5/06* (2006.01)
*G01M 3/00* (2006.01)

(52) U.S. Cl.
CPC ............. *G01M 3/182* (2013.01); *F17D 5/06* (2013.01); *G01M 3/007* (2013.01); *G01M 3/40* (2013.01)

(58) Field of Classification Search
CPC ........ G01M 3/182; G01M 3/007; G01M 3/40; G01M 3/002; G01M 3/243; G01M 3/2815; F17D 5/06; F17D 5/02
USPC ........................................................ 340/605
See application file for complete search history.

(56) References Cited

U.S. PATENT DOCUMENTS

| | | |
|---|---|---|
| 3,304,546 A | 2/1967 | Kern |
| 5,117,677 A | 6/1992 | Hendershot et al. |
| 5,272,646 A | 12/1993 | Farmer |

(Continued)

FOREIGN PATENT DOCUMENTS

| | | |
|---|---|---|
| EP | 0 697 587 B1 | 2/1996 |
| RO | 127431 B1 | 1/2015 |

OTHER PUBLICATIONS

Adegboye et al. "Recent Advances in Pipeline Monitoring and Oil Leakage Detection Technologies: Principles and Approaches," Sensors 2019, 19, 2548, doi:10.3390/s 191 12548 Jun. 4, 2019. Retrieved from Internet: <URL: https://www.mdpi.com/1424-8220/15/2/3830/pdf> pp. 1-36.

(Continued)

*Primary Examiner* — Omar CasillasHernandez
(74) *Attorney, Agent, or Firm* — Foley & Lardner LLP

(57) ABSTRACT

An apparatus for the continuous monitoring of a pipeline or a pipeline network carrying flowing media that can not only detect the presence of a leak but also locate the source of the leak through the use of rarefaction wave detection and methods of using the same is disclosed within. The apparatus and method are specifically configured to locate the leak source within less than 36 inches using a calibration means and a noise cancellation means.

23 Claims, 19 Drawing Sheets

(56) References Cited

U.S. PATENT DOCUMENTS

| | | | |
|---|---|---|---|
| 5,974,862 A * | 11/1999 | Lander | G01M 3/243 |
| | | | 73/592 |
| 6,389,881 B1 | 5/2002 | Yang et al. | |
| 7,051,580 B1 | 5/2006 | Lewis et al. | |
| 8,479,566 B2 | 7/2013 | Haseloh et al. | |
| 2005/0279169 A1 * | 12/2005 | Lander | G01N 29/14 |
| | | | 73/592 |
| 2007/0068225 A1 | 3/2007 | Brown | |
| 2010/0312502 A1 | 12/2010 | Alonso | |
| 2011/0093220 A1 | 4/2011 | Yang et al. | |
| 2012/0061084 A1 | 3/2012 | Sweatman et al. | |
| 2012/0272722 A1 | 11/2012 | Khalifa et al. | |
| 2013/0036796 A1 | 2/2013 | Fleury et al. | |
| 2014/0154991 A1 | 6/2014 | Brown et al. | |
| 2014/0305513 A1 | 10/2014 | McDowell | |
| 2014/0348205 A1 * | 11/2014 | Shaw | E03B 7/09 |
| | | | 374/142 |
| 2015/0052979 A1 * | 2/2015 | Cho | G01M 3/243 |
| | | | 73/40.5 A |
| 2015/0198497 A1 * | 7/2015 | Merlob | G01N 29/265 |
| | | | 73/592 |
| 2016/0252422 A1 | 9/2016 | Howitt | |
| 2017/0076563 A1 | 3/2017 | Guerriero et al. | |
| 2017/0323039 A1 | 11/2017 | Kumar et al. | |
| 2018/0162344 A1 | 6/2018 | Covello et al. | |
| 2018/0202612 A1 | 7/2018 | Simpson et al. | |
| 2018/0231167 A1 | 8/2018 | Wallace et al. | |
| 2018/0356046 A1 | 12/2018 | Gong et al. | |
| 2019/0136492 A1 * | 5/2019 | Trescott | E03B 7/071 |
| 2019/0246248 A1 | 8/2019 | Baroudi et al. | |
| 2020/0103306 A1 * | 4/2020 | Mine | G01M 3/007 |

OTHER PUBLICATIONS

Foreign Action other than Search Report on PCT PCT/US2020/044904 dated Feb. 17, 2022.

International Search Report and Written Opinion on PCT PCT/US2020/044904 dated Feb. 22, 2021, 19 pages.

Supplemental Partial European Search Report, From EP 20850498.5, dated Aug. 23, 2023.

* cited by examiner

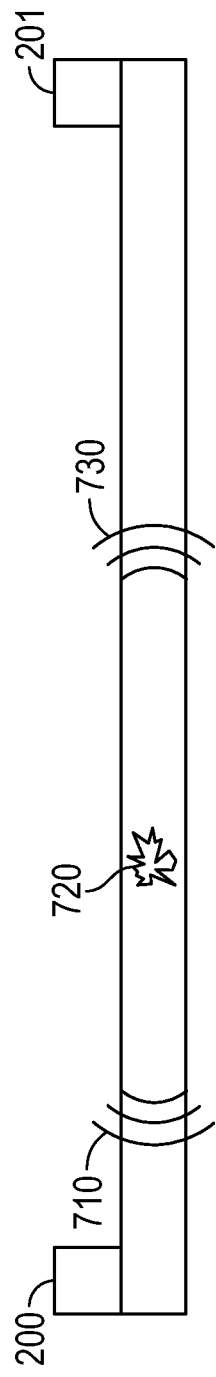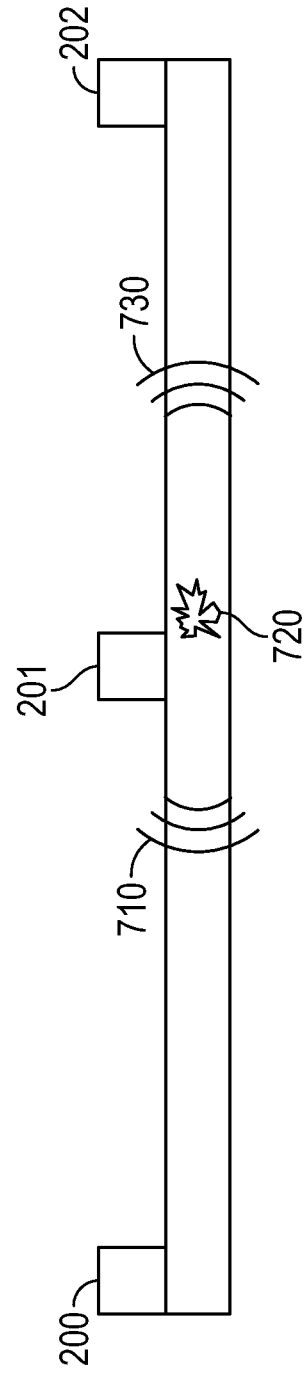

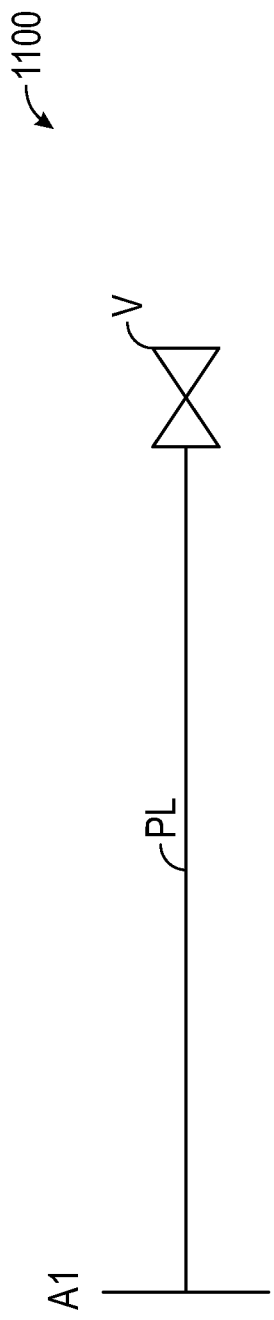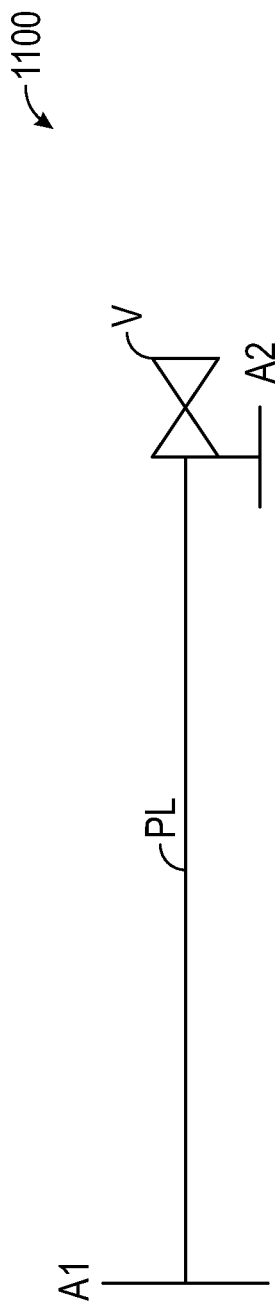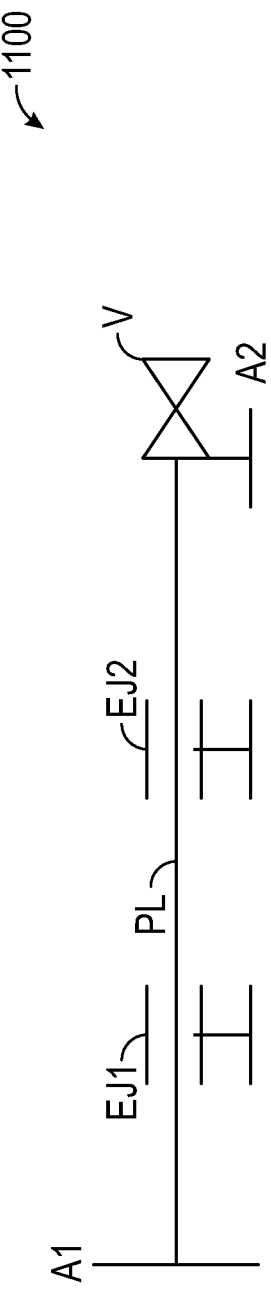

Table 1. Pipe Support Factor

| Case | Pipe supporting condition |
|---|---|
| 1 | Pipe anchored at the upstream end only<br><br>$\Psi = [1/(1+e/D)][5/4 - u + 2(e/D)(1+u)(1+e/D)]$ |
| 2 | Pipe anchored against any axial movement<br><br>$\Psi = [1/(1+e/D)][1 - u^2 + 2(e/D)(1+u)(1+e/D)]$ |
| 3 | Case 2 plus longitudinal expansion joints along the pipeline<br><br>$\Psi = [1/(1+e/D)][1 + 2(e/D)(1+u)(1+e/D)]$ |

FIG. 19

PIPELINE LEAK DETECTION APPARATUS, AND METHODS THEREOF

PRIOR RELATED APPLICATIONS

This application is a continuation of U.S. Nonprovisional patent application Ser. No. 16/944,779, filed on Jul. 31, 2020, which was a continuation-in-part of U.S. Nonprovisional patent application Ser. No. 16/532,371 entitled "A PIPELINE LEAK DETECTION APPARATUS AND A METHOD OF USING SAME," filed on Aug. 5, 2019.

FIELD OF THE INVENTION

The present invention relates to an apparatus used to detect leaks in pipelines carrying flowing media and a method of using the apparatus to achieve an improved level of performance. More specifically, it relates to an apparatus and a method of using the same to identify pipeline anomalies by detecting and analyzing rarefaction waves.

BACKGROUND OF THE INVENTION

Pipeline transportation of a media, whether liquid or gas, is a reliable and proven method of moving the media from one location to another. The media and pressure under which it is transported vary; however, the fundamental objective remains the same: to safely move it from point A to point B without suffering loss, which not only affects profitability but also endangers the environment, personnel, and the public at large. The cause of such failure can vary. Whether a result of age, force majeure, or malice, pipelines (or even elements of a pipeline network) can fail, ultimately resulting in media loss. For example, pipeline networks can experience component degradation, small leaks due to material impurities or chemical reactions, significant wall ruptures, and even product theft via siphoning. With so many potential sources of media loss, it is imperative that leak detection be timely, accurate, and precise.

A variety of approaches to leak detection are currently used in the relevant industry. Many approaches require some form of active observation along the length of the pipeline or the surrounding area. These previous attempts range from the most basic—physically driving along the pipeline and visually inspecting for leaks—to advanced technologies involving drones with hyperspectral imaging or gas analyzers used to detect leaking particles of product on the order of a few parts-per-million. All physical inspection techniques are costly and time consuming. Moreover, advanced drone-based technology is consistently cost prohibitive.

Many attempts have been made to detect and locate media leaks using pressure sensors with or without flow meters. The most fundamental approach involves monitoring pressure and flow values and comparing those values against predetermined thresholds. Slightly more sophisticated are the Balance methods, which are known in the art as methods that compare the volume of flow at two points to determine if a leak is present. Finally, there are techniques that seek to identify leaks by analyzing rarefaction waves.

Of particular relevance to the present invention is the science of rarefaction, which is understood by a person of ordinary skill in the art as the reduction of a media's density due to a nonuniform boundary condition. This reduction in density creates a longitudinal wave that travels along the direction of the flowing media, both aligned and counter-aligned. By identifying this wave, the presence of a leak can be confirmed.

Confirming the presence of a leak is only half of the task and a reasonably straight-forward one at that. Identifying a leak can be accomplished through a simple flowmeter as mentioned earlier. Identifying the precise location of a leak is another matter entirely. To put it another way, it is not enough to know that a problem exists, the location of the problem must be pinpointed so it can be addressed.

A limitation of the current technology is an inability to accurately locate the source of leaks. For example, many systems and methods produce unreliable "events" (e.g., background noise, normal pipeline transient pump and valve operations) which indicate that a leak may be present. Still more, current systems suffer from insufficient resolution (e.g., difficulty detecting time of leak initiation, lack of calibrating correct rate of signal propagation, lack of accounting for changes in rate of signal propagation due to changes in fluid properties), meaning that although they can reliably determine whether a leak has occurred, generally, they are unable to estimate the location any more accurately than hundreds of feet—essentially negating the main objective.

A preferred embodiment of the invention contain herein advances the current art by disclosing a leak detection apparatus and method for using the apparatus that accurately locates the presence of leaks within about 10 feet, and any range or value there between. In some instances, the leak detection apparatus and method for using the apparatus accurately locates the presence of leaks within about 36 inches.

SUMMARY OF THE INVENTION

The present invention is directed to a leak detection system and a method of using the same, configured with multiple pressure sensing means (e.g., density sensor, pressure sensor, temperature sensor), connecting structures, synchronized timing mechanisms, both a transmitting and a receiving component (e.g., I/O ports), and a data storage means (e.g., memory), which when all combined enable the detection of a leak, increase the accuracy of locating the leak, and reduce the occurrence of an erroneous leak identification that is common when traditional rarefaction leak detection techniques are used.

The pressure sensing means (e.g., pressure sensors) may be one or more of an absolute pressure transducer, a differential pressure transducer, a gauge referenced pressure transducer and any other pressure transducer.

Pipeline Leak Detection Apparatus

The primary embodiment utilizes at least two sensor nodes that need not be identical, each comprising at least one pipeline interface, at least one means of taking pressure measurements, at least one time synchronization means, at least one processing means (e.g., processor), at least one means of storing data (e.g., memory), at least one means of transmitting data (e.g., I/O ports), and a power source (e.g., power supply) that a person of ordinary skill in the art would recognize as being capable of being provided by a variety of means, i.e., a connection to a power grid, a battery, a solar cell, or any combination therein sufficient to power the sensor node.

Additionally, the preferred embodiment comprises of at least one data aggregation point, each of which in turn comprises of at least one means of receiving data (e.g., I/O ports), at least one means of storing data (e.g., memory), at least one response specific interface (e.g., user interface), at least one data processing unit (e.g., processor), and a power source (e.g., power supply) similar the sensor node yet configured to the data aggregation point, which may but need not be identical.

In the preferred embodiment, a plurality of sensor nodes are disposed onto a plurality of risers disposed on a pipeline or a pipeline network. Although a sensor node may be disposed at any location on the pipeline or the pipeline network, the best mode of practicing the invention involves disposing each of the plurality of sensor nodes onto the risers.

A sensor node in the current embodiment generates a data point comprising of at least two elements: a pressure measurement and a timestamp. The pressure measurement may be absolute, gauge, or referenced to an alternative datum. A person of ordinary skill in the art would recognize that various other embodiments may comprise of any pressure sensing means (e.g., pressure sensor).

The data point timestamp is generated by a synchronized timing mechanism that permits a plurality of sensor pressure nodes to synchronize each of its respective measurements within 100 μs of each other. A person of ordinary skill in the art will recognize that 60 kHz WWBV, GPS, similar technology, or any combination therein can be used to generate the necessary timestamp. In the preferred embodiment, a data point is stored in memory, awaiting transmission, until a triggering event is observed. A triggering event is a next scheduled reading triggered by a synchronization means. Multiple data points stored in memory collectively are referred to as a "data set."

In the disclosed invention, a sensor node gathers pressure data at regular time intervals. In an embodiment, the regular intervals may occur at a frequency of at least 10 Hz, and any range or value there between. In an embodiment, the regular intervals may occur at a frequency between about 20 Hz and about 20 kHz or higher as data processing capabilities allow, and any range or value there between. In an embodiment, the regular intervals may occur at a frequency between about 20 Hz and about 10 kHz, and any range or value there between. In a preferred embodiment, the regular intervals may occur at a frequency of about 1000 Hz. The required sample rate of distinguishing a leak event is dependent on both the leak signal to pipeline pressure noise ratio (i.e., amplitude of leak signal/amplitude of pipeline pressure noise). For example, the lower the leak signal to pipeline pressure noise ratio and the higher the frequency of pipeline pressure noise, the higher the required sample rate.

A hardware interrupt signal initiates each reading. During each reading, the sensing means determines the pressure and relays the pressure reading to the sensor node processing means. Similarly, the synchronized timing means relays a timestamp to the sensor node processing means.

In the disclosed invention, the sensor node processing means compares a first reading (taken during the immediately preceding interval) to a second reading (taken in the instant interval). By this way, the sensor node processing means (e.g., processor) can identify when a leak event is detected at a given sensor node. Specifically, when a predefined reduction in pressure is noticed between two temporally adjacent readings, a pressure event is considered to be identified. After the comparison is complete, the second reading is transferred to the memory model, regardless of whether a leak was detected.

In an alternate embodiment, the pressure event is determined by comparing the current pressure reading and the average of a preset number of previous pressure readings. In another embodiment, the processing means (e.g., processor) determines the presence of a pressure event based upon the second derivative of pressure over time using numerical integration techniques typical in the art. In yet another embodiment, the determination of a pressure event is based on a feature detection algorithm the matches structurally similar pressure features.

A data set must contain a sufficient amount of data to match pressure events from two sensor nodes. Specifically, the data set must contain a minimum amount of data before and after the event. This amount of data is uniquely determined by the pipeline distance between a first sensor node and a second sensor node. Moreover, each subsequent pair of sensor nodes in the plurality of sensor nodes may have a distinct data requirement.

In the present invention, it is assumed that the velocity of the flowing media is negligible when compared to the speed of sound. Making this assumption allows the following statement to be true: the amount of time it takes for an event occurring at a first sensor node to be detected by a second sensor node cannot be greater than the pipeline distance between the first sensor node and the second sensor node divided by the speed of sound. This is known as the maximum time ($\Delta Tmax$). With this tenet, it follows that if an event is detected at a first sensor node, the event must also be detected at a second sensor node at some time between $\Delta Tmax$ prior to the moment of detection at the first sensor node and $\Delta Tmax$ after the moment of detection at the first sensor node.

In the preferred embodiment, it is not sufficient to only retain a data set that is $\Delta Tmax$ in duration because this does not allow for event detection to be confirmed by a data aggregation point. The disclosed invention requires that the data set duration must be, at minimum, longer than $\Delta Tmax$. Specially, the preferred embodiment retains anywhere from twice $\Delta Tmax$ to four times $\Delta Tmax$.

When a plurality of sensor nodes are used, a person of ordinary skill in the art would recognize that the duration of a data set is determined by the greater of a first $\Delta Tmax$ occurring between a first sensor node adjacent to a second sensor node and a second $\Delta Tmax$ occurring between the second sensor node and an adjacent third sensor node.

In the preferred embodiment, a data set is received from each of the plurality of sensor nodes by one or more data aggregation points. The data set is then passed from the receiving means to a data processing unit (e.g., processor), which could consist of a personal computer transformed using software configured for the data set analysis that also includes some form of user interface, and a memory storage device or specialized hardware configured for the data set analysis that may or may not include some form of user interface. An exemplary computing device for the pipeline leak detection apparatus is discussed below.

In another embodiment, a pressure transducer contained within the sensor node comprises a differential pressure transducer and at least one means of equalizing the pressure across the differential pressure transducer. A person of ordinary skill in the art would recognize that a differential pressure transducer could make it easier to identify pressure gradients generated by propagating pressure waves because of the increased resolution associated with differential measurements, especially if the overall line pressure is high compared to the pressure change occurring from a rarefaction wave as is typical.

A data aggregation point processing means compares a first data set obtained from a first sensor node with a second data set obtained from a second sensor node. By matching the identified pressure events between the two data sets, the timestamps contained therein can also be compared. The time of a pressure event is determined from the leading edge of the pressure drop event. Once the timestamps are compared, then the difference in time can be calculated. Specifically, if the difference in time is less than the ΔTmax, then the triggering event occurred in between the first and second sensor nodes. If not, the event occurred between either the first sensor node or second sensor node, and a third sensor node. The processing means checks adjacent sensor nodes until the two nodes being compared yield a difference in time is less than the ΔTmax.

The data aggregation point processing means then determines a linear pipeline distance that corresponds to the difference in time. Specifically, the distance is calculated based on the speed of sound in a given media, which can be a function of the temperature (subsequently the localized speed of sound) and the velocity. Contemporaneous measurements of these parameters is known to likely increase the accuracy of determining the linear location of a pressure event.

Alternatively, and as would be recognized by one of ordinary skill in the art as being generally equivalent, is to compare length calculations instead of time calculations. Specifically, the difference in time as determined from the timestamp comparisons can be used to calculate the length from the event, assuming a constant speed of sound. If the calculated length exceeds the length between the nodes, then the event occurred outside of the linear boundaries of the two nodes under analysis. Although offering no advantage in leak location identification, this method provides the marginal benefit of providing the operator/user with a more intuitive representation of the leak location. Unlike previous inventions, if the location of a leak is determined to be close to one of the sensor nodes used for calculation, i.e., determined to be at either node but within the location uncertainty calculation, then a confirming calculation is made using a third sensor node. The third sensor node is chosen to be a node from the pipeline network that would cause the location calculation of the event to be bound between the sensor node that is not the location of the leak and the third sensor node.

In addition to the use of pressure sensors, piezoelectric sensors could be deployed to provide additional leak detection on gas pipelines where the pressure signal associated with a pipeline leak could be heavily attenuated due gas being more compressible than for example oil or water. A leak from a gas pipeline produces a loud audible noise which translates into vibrations in the pipeline wall. Piezoelectric sensors are used to detect these vibrations associated with a pipeline leak.

By using a combination of pressure sensors and piezoelectric sensors with the outlined detection methods, greater certainty could be provided in detecting leaks in gas pipelines where the pressure signal alone may be less easy to detect.

The preferred embodiment also compares the pipeline leak location against a known array of pipeline network elements. This way, the apparatus can determine whether the source of the leak is a pipeline network element, i.e., a valve. If the location does not correspond to a known element such as a pipeline valve or pump, the operation of which could generate pipeline pressure noise causing a false positive leak detection, then this false positive would be rejected. Alternatively, if the location does correspond to a known element, then the alert is assigned a lower priority. Locations outside the reporting sensor nodes, locations where the reporting sensor nodes are not the immediate adjacent sensor nodes are rejected as not being a leak for the reporting pair.

In an embodiment, a pipeline leak detection apparatus for detection and location of a leak in a pipeline or a pipeline network comprises: a plurality of sensor node subassemblies and a data aggregation point subassembly.

In an embodiment, each of the plurality of sensor node subassemblies comprise: a sensor node; a pressure sensing means; a sensor node processing means; a transmitting means; a synchronization means; a sensor node memory storage means; and a sensor node power supply. In an embodiment, each of the plurality of sensor node subassemblies are configured and disposed on a pipeline or a pipeline network.

In an embodiment, at least one of the plurality of sensor node subassemblies comprises a fitting configured to dispose the pressure sensing means on a pipeline or pipeline network. In an embodiment, at least one of the plurality of sensor node subassemblies comprises a ball valve, a bleed-off valve, a quarter turn ball or a small bore valve. In an embodiment, at least one of the plurality of sensor node subassemblies comprises a fitting configured to connect to a hose.

In an embodiment, at least one of the pressure sensing means comprises a differential pressure transducer. In an embodiment, at least one of the pressure sensing means comprises an absolute pressure transducer. In an embodiment, at least one of the pressure sensing means comprises a gauge referenced pressure transducer.

In an embodiment, the data aggregation point subassembly comprises: a receiving means; a data aggregation point processing means; a data aggregation memory storage means; a data aggregation power supply; and a user interface.

In an embodiment, a method of using a pipeline leak detection apparatus for detecting and locating a leak in a pipeline or a pipeline network comprises a first sensor node subassembly that waits until it is triggered by a synchronization means.

Once triggered, a sensor node processing means instructs a pressure sensing means to measure and return a data point. The data point is contemporaneously stored into a data set located in a memory storage means.

The data point is analyzed by the sensor node processing means to identify a pressure event. When a pressure event is not present, the method returns to waiting for the next trigger event. If, on the other hand, a pressure event is present, then the sensor node processing means determines whether the pressure event is located, temporally, in the center of the data set. If the pressure event is not in the center of the data set, temporally, the method returns and waits for another sensor node transmission. If, on the other hand, the pressure event is temporally located in the center of the data set, the method transmits the data set to a data aggregation point.

The data aggregation point waits for transmission from a sensor node subassembly. A first data set is received from the first sensor node subassembly. The first data set is stored in a memory storage means.

A data aggregation point processing means determines whether the first data set is the only data set or rather if it is a second data set received from a second, adjacent sensor node subassembly. If the data set was not received from a second, adjacent sensor node subassembly, then the data aggregation point returns and waits for a second data set transmission from a second sensor node subassembly. If, on the other hand, the data set was received from a second, adjacent sensor node, then the data set is analyzed for a pressure event and the location along the pipeline of the event is determined. If the location is not within a distance uncertainty of a sensor node subassembly or located at a sensor node subassembly, then the location of the event is reported to a user.

In an embodiment, when a location of the event is within a distance uncertainty of a sensor node subassembly, then the method uses a third, adjacent to the second yet not adjacent to the first sensor node subassembly to perform the calculation.

In an embodiment, the method further comprises: temperature measurements to refine the necessary rarefaction calculations thereby increasing the accuracy of the location.

In an embodiment, a pipeline leak detection apparatus for detection and location of a leak in a pipeline comprises: a first pressure sensing means fluidly connected to the pipeline; a second pressure sensing means fluidly connected to the pipeline, wherein the second pressure sensing means is a known distance from the first pressure sensing means; a processor means, wherein the first pressure sensing means is communicatively connected to the processor means and wherein the second pressure sensing means is communicatively connected to the processor means; and a memory storage means operatively coupled to the processor means.

In an embodiment, instructions are stored in the memory storage means and are executable by the processor means to instruct the apparatus to: upon a first trigger event, instruct the first pressure sensing means to measure pressure and to transmit a first data point to the processor means; contemporaneously store the first data point into a first data set located in the memory storage means; analyze the first data point to identify a first pressure event; if the first pressure event is temporally located in the center of the first data set, store the first data set in the memory storage means; determine whether the first data set is the only data set or if it is a data set received from the second pressure sensing means; if the first data set was received from the second pressure sensing means, analyze the first data set for the first pressure event; and determining a location of the first pressure event along the pipeline. In an embodiment, the instructions comprise further instructions to instruct the apparatus to: use a temperature measurement from a temperature sensing means to determine the location of the first pressure event.

In an embodiment, the instructions comprise further instructions to instruct the apparatus to: if the location is not within a distance uncertainty of the first pressure sensing means or located at the first pressure sensing means, report the location of the first pressure event is to a user via an user interface.

In an embodiment, the instructions comprise further instructions to instruct the apparatus to: when the location of the first pressure event is within the distance uncertainty of the first pressure sensing means, use a third data point and a third data set from a third pressure sensing means to determine the location of the first pressure event, wherein the third pressure sensing means is adjacent to the second pressure sensing means but not adjacent to the first pressure sensing means. In an embodiment, the instructions comprise further instructions to instruct the apparatus to: use a temperature measurement from a temperature sensing means to determine the location of the first pressure event.

In an embodiment, the instructions comprise further instructions to instruct the apparatus to: when the first pressure event is not present, wait for a second trigger event; and upon the second trigger event, instruct the first pressure sensing means to measure pressure and to transmit a second data point to the processor means; contemporaneously store the second data point into a second data set located in the memory storage means; analyze the second data point to identify a second pressure event; if the second pressure event is temporally located in the center of the second data set, store the second data set in the memory storage means; determine whether the second data set is the only data set or if it is a data set received from the second pressure sensing means; if the data set was received from the second pressure sensing means, analyze the second data set for the second pressure event; and determine a location of the second pressure event along the pipeline.

In an embodiment, one or more of the first pressure sensing means and the second pressure sensing means comprises a fitting configured to dispose the pressure sensing means on a pipeline or pipeline network.

In an embodiment, one or more of the first pressure sensing means and the second pressure sensing means comprises a ball valve. In an embodiment, one or more of the first pressure sensing means and the second pressure sensing means comprises a ball valve, a bleed-off valve, a quarter turn valve or a small bore valve. In an embodiment, one or more of the first pressure sensing means and the second pressure sensing means comprises a quarter turn valve. In an embodiment, one or more of the first pressure sensing means and the second pressure sensing means comprises a small bore valve.

In an embodiment, one or more of the first pressure sensing means and the second pressure sensing means comprises a fitting configured to connect to a hose.

In an embodiment, at least one of the pressure sensing means comprises a differential pressure transducer. In an embodiment, at least one of the pressure sensing means comprises an absolute pressure transducer. In an embodiment, at least one of the pressure sensing means comprises a gauge referenced pressure transducer.

In an embodiment, one or more nontransitory computer-readable storage media comprises computer-executed instructions to instruct a computing device to: upon a first trigger event, instruct the first pressure sensing means to measure pressure and to transmit a first data point to the processor means; contemporaneously store the first data point into a first data set located in the memory storage means; analyze the first data point to identify a first pressure event; if the first pressure event is temporally located in the center of the first data set, store the first data set in the memory storage means; determine whether the first data set is the only data set or if it is a data set received from the second pressure sensing means; if the first data set was received from the second pressure sensing means, analyze the first data set for the first pressure event; and determine a location of the first pressure event along the pipeline. In an embodiment, the computer-executable instruction comprise computer-executable instructions to instruct the computing device to: use a temperature measurement from a temperature sensing means to determine the location of the first pressure event.

In an embodiment, the computer-executable instruction comprise computer-executable instructions to instruct the computing device to: if the location is not within a distance uncertainty of the first pressure sensing means or located at the first pressure sensing means, report the location of the first pressure event is to a user via an user interface.

In an embodiment, the computer-executable instruction comprise computer-executable instructions to instruct the computing device to: when the location of the first pressure event is within the distance uncertainty of the first pressure sensing means, use a third data point and a third data set from a third pressure sensing means to determine the location of the first pressure event, wherein the third pressure sensing means is adjacent to the second pressure sensing means but not adjacent to the first pressure sensing means.

In an embodiment, the computer-executable instruction comprise computer-executable instructions to instruct the computing device to: use a temperature measurement from a temperature sensing means to determine the location of the first pressure event.

In an embodiment, the computer-executable instruction comprise computer-executable instructions to instruct the computing device to: when the first pressure event is not present, wait for a second trigger event; and upon the second trigger event, instruct the first pressure sensing means to measure pressure and to transmit a second data point to the processor means; contemporaneously store the second data point into a second data set located in the memory storage means; analyze the second data point to identify a second pressure event; if the second pressure event is temporally located in the center of the second data set, store the second data set in the memory storage means; determine whether the second data set is the only data set or if it is a data set received from the second pressure sensing means; if the data set was received from the second pressure sensing means, analyze the second data set for the second pressure event; and determine a location of the second pressure event along the pipeline.

In an embodiment, a pipeline leak detection apparatus for detection and location of a leak in a pipeline comprises: a first pressure sensing means fluidly connected to the pipeline; a second pressure sensing means fluidly connected to the pipeline, wherein the second pressure sensing means is a known distance from the first pressure sensing means; a processor means, wherein the first pressure sensing means is communicatively connected to the processor means and wherein the second pressure sensing means is communicatively connected to the processor means; and a memory storage means operatively coupled to the processor means.

In an embodiment, the first pressure sensing means is located at or near a pump or a valve of the pipeline. In an embodiment, the second pressure sensing means is located at or near a pump or a valve of the pipeline.

In an embodiment, the valve is a ball valve. In an embodiment, the valve is a bleed-off valve. In an embodiment, the valve is a quarter turn valve. In an embodiment, the valve is a small bore valve.

In an embodiment, instructions stored in the memory storage means and executable by the processor means to instruct the apparatus to: open and close a valve to release an amount of fluid to create a first pressure wave for a first pressure event during an initial set-up of the apparatus; measure a first time difference for the first pressure wave using the first pressure sensing means and the second pressure sensing means; calculate an actual rate of propagation for the first pressure wave using the processor means; and calculate an actual rate of propagation for the first pressure wave.

In an embodiment, the instructions comprise further instructions to instruct the apparatus to: measure density of the fluid using a density sensing means; and calculate an initial calibration point for sonic velocity using the processor means.

In an embodiment, the instructions comprise further instructions to instruct the apparatus to: store the initial calibration point for sonic velocity to the memory storage means.

In an embodiment, the instructions comprise further instructions to instruct the apparatus to: detect a second pressure wave for a second pressure event during operation of the apparatus; measure a second time difference for the second pressure wave using the first pressure sensing means and the second pressure sensing means; calculate a rate of propagation for the second pressure wave using the processor means; measure density of the fluid using the density sensing means; and calculate a re-calibration point for sonic velocity.

In an embodiment, the instructions comprise further instructions to instruct the apparatus to: store the re-calibration point for sonic velocity to the memory storage means.

In an embodiment, the instructions comprise further instructions to instruct the apparatus to: measure temperature of the fluid using a temperature sensing means; correct one or more of Young's bulk modulus of the fluid, density of the fluid, and Young's modulus of the pipeline for temperature; and calculate a corrected re-calibration point for sonic velocity.

In an embodiment, the instructions comprise further instructions to instruct the apparatus to: store the corrected re-calibration point for sonic velocity to the memory storage means.

In an embodiment, the instructions comprise further instructions to instruct the apparatus to: detect a third pressure wave for a third pressure event during operation of the apparatus; measure a third time difference for the third pressure wave using the first pressure sensing means and the second pressure sensing means; compare the third pressure wave to a transient pressure signal for a pump operation and/or a valve operations; fit the third pressure wave to the transient pressure signal using a least difference best fit; and invert the transient pressure signal and add the inverted transient pressure signal to the third pressure wave to obtain background noise or clean pressure wave.

In an embodiment, the instructions comprise further instructions to instruct the apparatus to: determine a location for the third pressure event.

In an embodiment, the instructions comprise further instructions to instruct the apparatus to: report the location for the third pressure event to an operator.

In an embodiment, a method of calibrating a pipeline leak detection apparatus comprises: providing a pipeline leak detection apparatus as discussed herein; opening and closing a valve to release an amount of fluid to create a first pressure wave for a first pressure event during an initial set-up of the apparatus; measuring a time difference for the first pressure wave using a first pressure sensing means and a second pressure sensing means; calculating an actual rate of propagation for the first pressure wave; and calculating an actual rate of propagation for the pressure wave.

In an embodiment, the method further comprises: measuring density of the fluid using a density sensing means; and calculating an initial calibration point for sonic velocity.

In an embodiment, the method further comprises: detecting a second pressure wave for a second pressure event during operation of the apparatus; measuring a second time difference for the second pressure wave using the first pressure sensing means and the second pressure sensing means; calculating a rate of propagation for the second pressure wave; measuring density of the fluid using the density sensing means; and calculating a re-calibration point for sonic velocity.

In an embodiment, one or more of the density sensing means, the first pressure sensing means and the second pressure sensing means are the same as those used in the initial set-up of the apparatus.

In an embodiment, the method further comprises: storing the re-calibration point for sonic velocity to the memory storage means.

In an embodiment, the method further comprises: measuring temperature of the fluid using a temperature sensing means; correcting one or more of Young's bulk modulus of the fluid, density of the fluid, and Young's modulus of the pipeline for temperature; and calculating a corrected re-calibration point for sonic velocity.

In an embodiment, one or more of the density sensing means, the first pressure sensing means and the second pressure sensing means are the same as those used in the initial set-up of the apparatus.

In an embodiment, the method further comprises: storing the corrected re-calibration point for sonic velocity to the memory storage means.

In an embodiment, the method further comprises: detecting a third pressure wave for a third pressure event during operation of the apparatus; measuring a third time difference for the third pressure wave using the first pressure sensing means and the second pressure sensing means; comparing the third pressure wave to a transient pressure signal for a pump operation and/or a valve operations; fitting the third pressure wave to the transient pressure signal using a least difference best fit; and inverting the transient pressure signal and add the inverted transient pressure signal to the third pressure wave to obtain background noise or clean pressure wave.

In an embodiment, the method further comprises: determining a location for the third pressure event along the pipeline.

In an embodiment, the method further comprises: reporting the location of the third pressure event to a user via an user interface The primary embodiment detects and locates leaks in a pipeline or a pipeline network transporting flowing media. A person of ordinary skill in the art of pipeline leak detection would recognize as obvious that the disclosed invention may be easily adapted to monitor pipelines located within a commercial building; monitor waterlines either in a residential, commercial, or mixed use building; to monitor wastewater disposal; or similar uses.

Alternative Pipeline Leak Detection Apparatus

The increased leak location accuracy provided by an initial calibration of sonic velocity, re-calibration of sonic velocity and correction of sonic velocity enable the potential positive potential leak events to be accurately predicted. Further, the use of quasi-active noise reduction leads to a significant reduction in the number of potential false positive leak indications. Therefore, the increased leak location accuracy and noise reduction results in an increase in apparatus sensitivity as smaller leaks may be detected without triggering false positive leak indications.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein:

FIG. 7 is a diagram depicting a leak location between two sensor nodes and pressure waves propagating from the leak location;

FIG. 8 is a diagram depicting an ambiguous leak location, one that places a pressure event at or around a sensor node, and pressure waves propagating from the ambiguous leak location;

FIG. 11A is a diagram depicting a pipeline having an anchor at an upstream to prevent any vertical movement and a valve at a downstream end;

FIG. 11B is a diagram depicting the pipeline for FIG. 11A having an anchor at the downstream end;

FIG. 11C is a diagram depicting the pipeline of FIG. 11B having longitudinal expansion joints along the pipeline to prevent longitudinal movement;

FIG. 19 is a table of pipe support factors.

DETAILED DESCRIPTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Pipeline Leak Detection Apparatus

Figure 1:
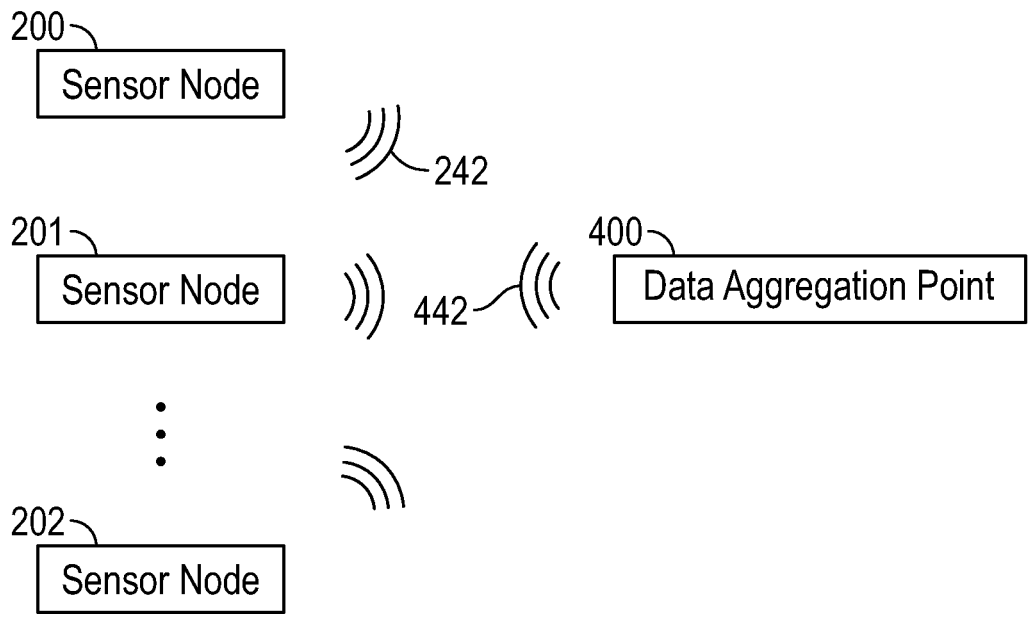
FIG. 1 depicts an overview of a pipeline leak detection apparatus according to a preferred embodiment.

Referring to the drawings, FIG. 1 depicts a main overview of a preferred embodiment, comprising of a first sensor node 200, at least one second sensor node 201, and an indeterminate amount of additional sensor nodes 202; a sensor node transmission signal 242; a data aggregation point reception signal 442; and a data aggregation point 400.

Not depicted but readily apparent and fairly implied in FIG. 1 is that each individual sensor node (e.g., 200, 201, and 202 as applicable) all transmit a unique sensor node transmission signal, which has been generalized as a sensor node transmission signal 242 for purposes of illustration only, to the data aggregation point 400.

Figure 2:
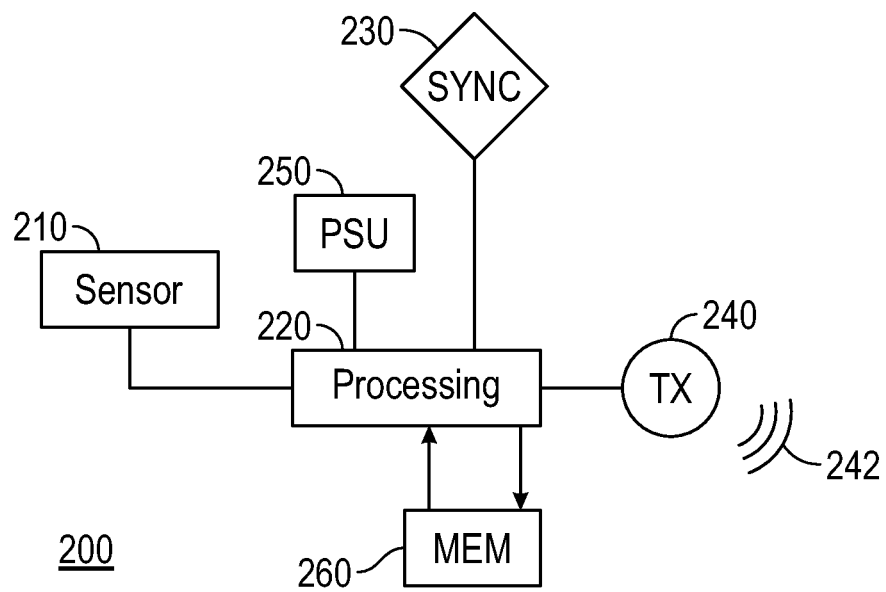
FIG. 2 depicts a sensor node subassembly of the pipeline leak detection apparatus according to a preferred embodiment.

FIG. 2 depicts a sensor node subassembly of the preferred embodiment. FIG. 2 depicts details of a sensor node 200, which comprises of a pressure sensing means 210 (e.g., pressure sensor); a processing hardware 220 (e.g., processor 1014); a synchronization (SYNC) means 230; a sensor node transmission means 240 (e.g., I/O ports 1018); a sensor node transmission signal 242; a sensor node power supply unit (PSU) 250 (e.g., power supply 1024); and a sensor mode memory storage (MEM) means 260 (e.g., memory 1012).

Figure 3:
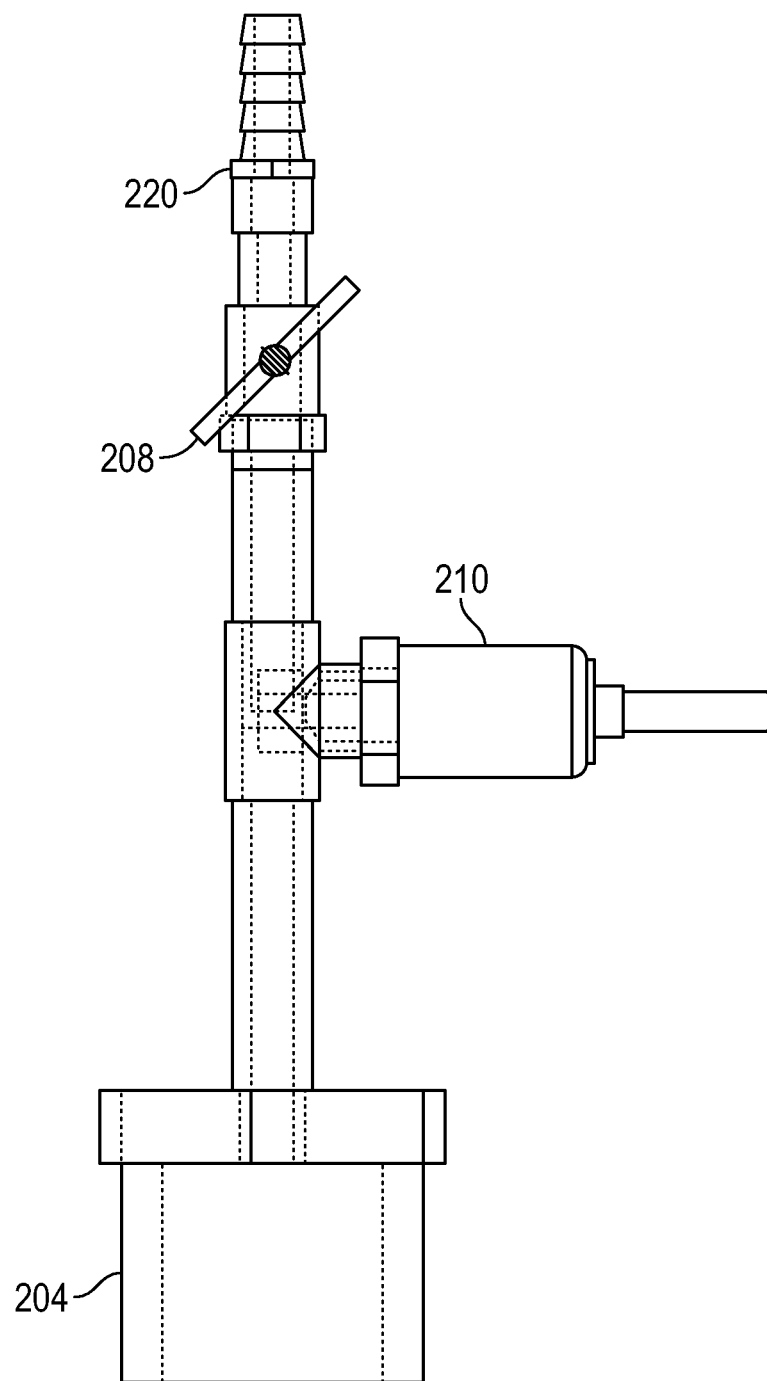
FIG. 3 depicts a sensor subcomponent and a pipeline mounting arrangement typically contained within a sensor node subassembly of the pipeline leak detection apparatus according to a preferred embodiment.

FIG. 3 depicts a sensor subcomponent and a pipeline mounting arrangement typically contained within a sensor node subassembly of the preferred embodiment. FIG. 3 is an isolated view of a sensor means, which comprises of a fitting 204 configured to dispose the system on to the pipeline network; a pressure sensing means 210 (e.g., pressure sensor); a bleed-off valve 208; and an optional bleed-off connection 220a.

Figure 4:
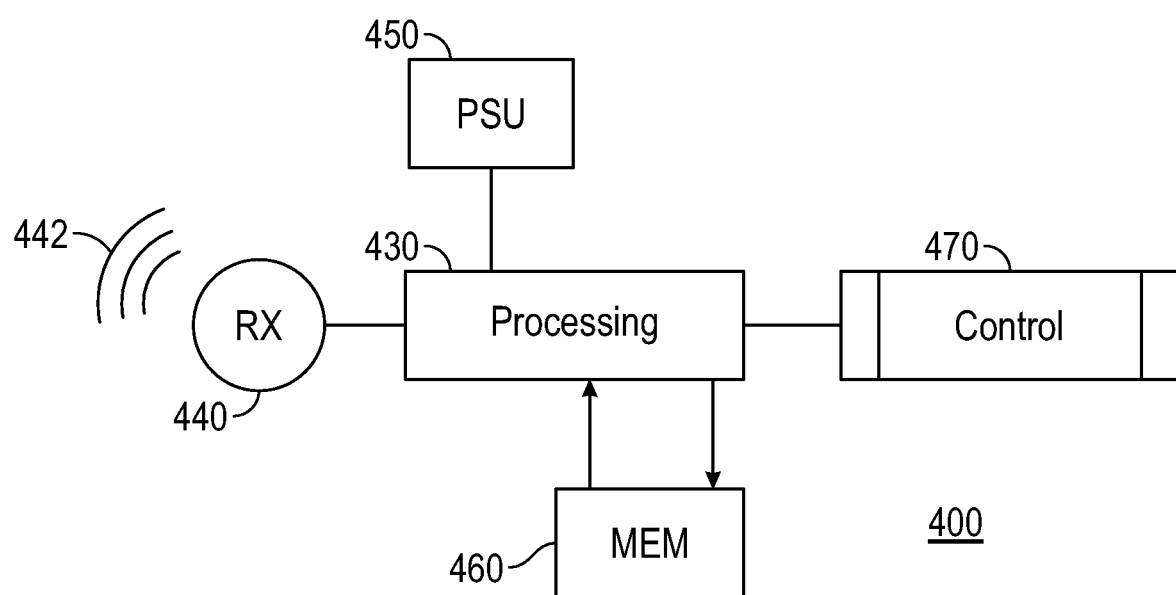
FIG. 4 depicts a data aggregation point of the pipeline leak detection apparatus according to a preferred embodiment.

FIG. 4 depicts a data aggregation point of the preferred embodiment. FIG. 4 is an isolated view of a data aggregation point 400, which comprises of an incoming sensor node transmission signal 442; a receiving (RX) means 440 (e.g., I/O ports 1018); a processing means 430 (e.g., processor 1014); a data aggregation point power supply unit (PSU) 450 (e.g., power supply 1024); a data aggregation point memory storage (MEM) means 460 (e.g., memory 1012); and a user interface (Control) 470 (e.g., user interface 1022).

Computing Device for Pipeline Leak Detection Apparatus

Figure 9:
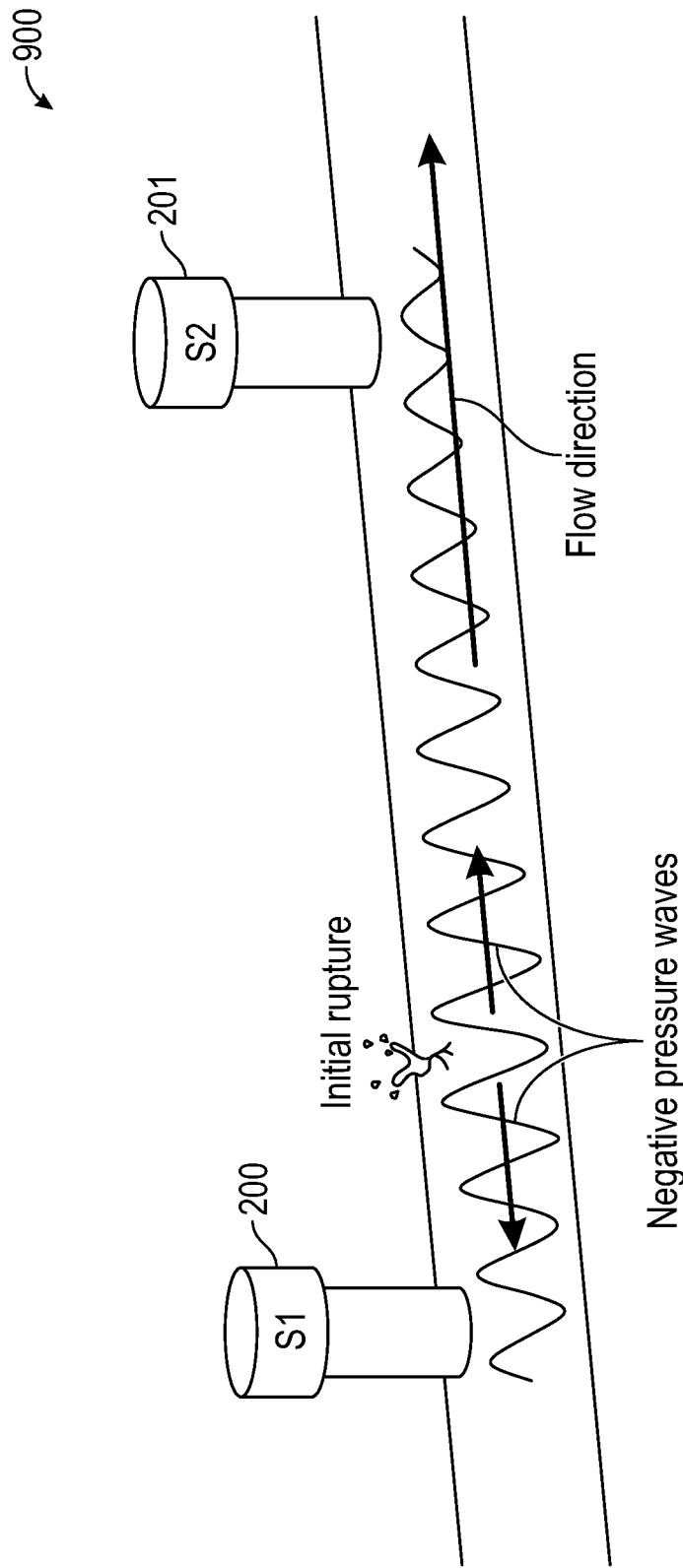
FIG. 9 is another diagram depicting a leak location between two sensor nodes and pressure waves propagating from the leak location.
Figure 10:
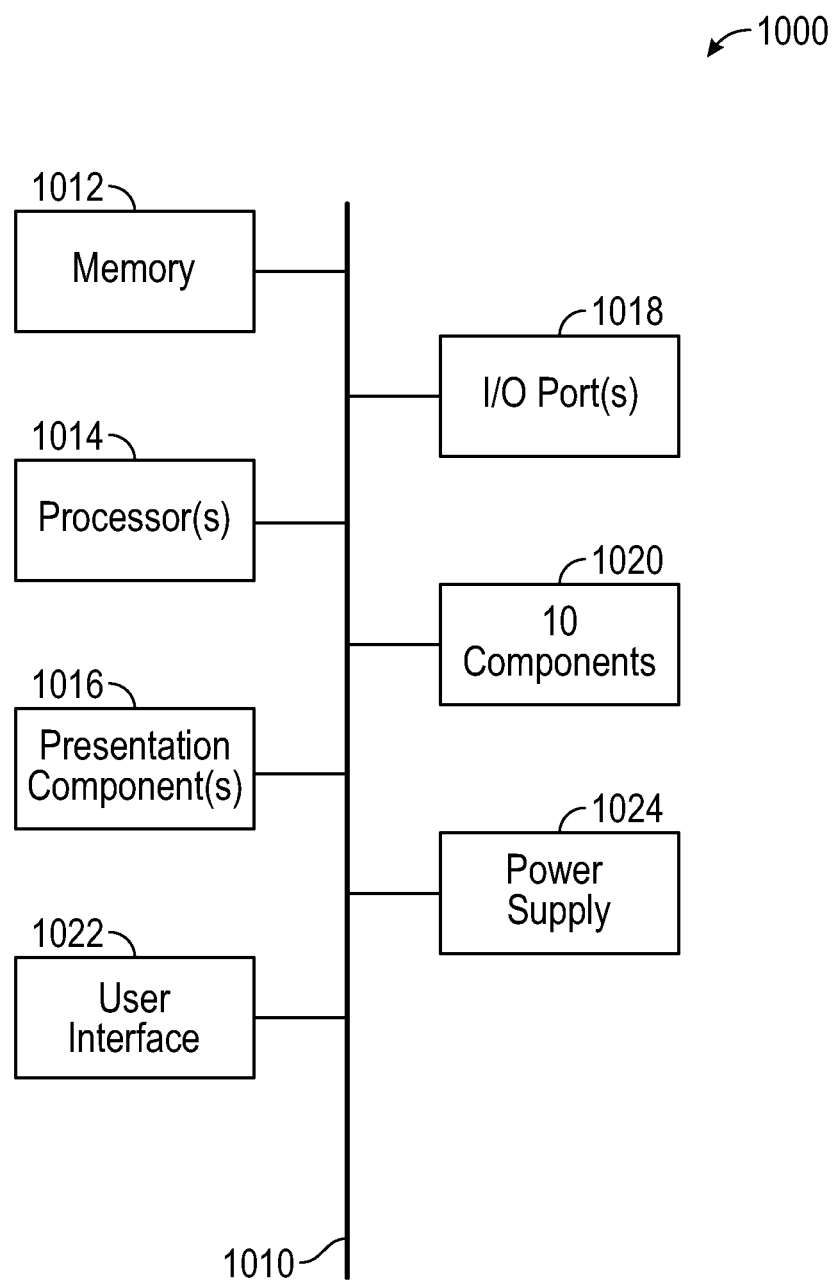
FIG. 10 is a schematic diagram of a computing device for the pipeline leak detection apparatus according to a preferred embodiment.

FIG. 10 illustrates a schematic diagram of a computing device for the pipeline leak detection apparatus according to the preferred embodiment. Referring to the drawings in general, and initially to FIGS. 1-3, 7-9, 12-13, 15 and 10 in particular, an exemplary operating environment for implementing embodiments of the present invention is shown and designated generally as a computing device 1000 for the pipeline leak detection apparatus. The computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-executable instructions stored as program modules or objects and executable by one or more computing devices, such as a laptop, server, mobile device, tablet, etc. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks may be performed by remote-processing devices that may be linked through a communications network.

With continued reference to FIG. 10, the computing device 1000 of the pipeline leak detection apparatus includes a bus 1010 that directly or indirectly couples the following devices: memory 1012, one or more processors 1014, one or more presentation components 1016, one or more input/output (I/O) ports 1018, I/O components 1020, a user interface 470, 1022 and an illustrative power supply 250, 1024. The bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be fuzzy. For example, one may consider a presentation component such as a display device to be an I/O component. Additionally, many processors have memory. The inventors recognize that such is the nature of the art, and reiterate that the diagram of FIG. 10 is merely illustrative of an exemplary computing device that can be used in connection with one or more embodiments of the present invention. Further, a distinction is not made between such categories as "workstation," "server," "laptop," "mobile device," "cloud-based device," etc., as all are contemplated within the scope of FIG. 10 and reference to "computing device."

The computing device 1000 of the pipeline leak detection apparatus typically includes a variety of computer-readable media. Computer-readable media can be any available media that can be accessed by the computing device 1000 and includes both volatile and nonvolatile media, removable and non-removable media. By way of example, and not limitation, computer-readable media may comprise computer-storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 1000.

The memory 260, 460, 1012 includes computer-storage media in the form of volatile and/or nonvolatile memory. The memory 260, 460, 1012 may be removable, non-removable, or a combination thereof. Suitable hardware devices include solid-state memory, hard drives, optical-disc drives, etc. The computing device 1000 of the pipeline leak detection apparatus includes one or more processors 220, 1014 that read data from various entities such as the memory 260, 460, 1012 or the I/O components 1020.

The presentation component(s) 1016 present data indications to a user or other device. In an embodiment, the computing device 1000 outputs present data indications including density, pressure, temperature and/or the like to a presentation component 1016. Suitable presentation components 1016 include a display device, speaker, printing component, vibrating component, and the like.

The user interface 470, 1022 allows the user to input/output information to/from the computing device 1000. Suitable user interfaces 470, 1022 include keyboards, key pads, touch pads, graphical touch screens, and the like. For example, the user may input a type of signal profile into the computing device 1000 or output a separation rate to the presentation component 1016 such as a display. In some embodiments, the user interface 470, 1022 may be combined with the presentation component 1016, such as a display and a graphical touch screen. In some embodiments, the user interface 470, 1022 may be a portable hand-held device. The use of such devices is well-known in the art.

The one or more I/O ports 1018 allow the computing device 1000 to be logically coupled to other devices including density sensing means (e.g., density sensors), pressure sensing means (e.g., pressure sensors), temperature sensing means (e.g., temperature sensors), and other I/O components 1020, some of which may be built in. Examples of other I/O components 1020 include a printer, scanner, wireless device, and the like.

Methods of Using Pipeline Leak Detection Apparatus

Method of Determining Occurrence of Pressure Event (Potential Leak Signal)

Figure 5:
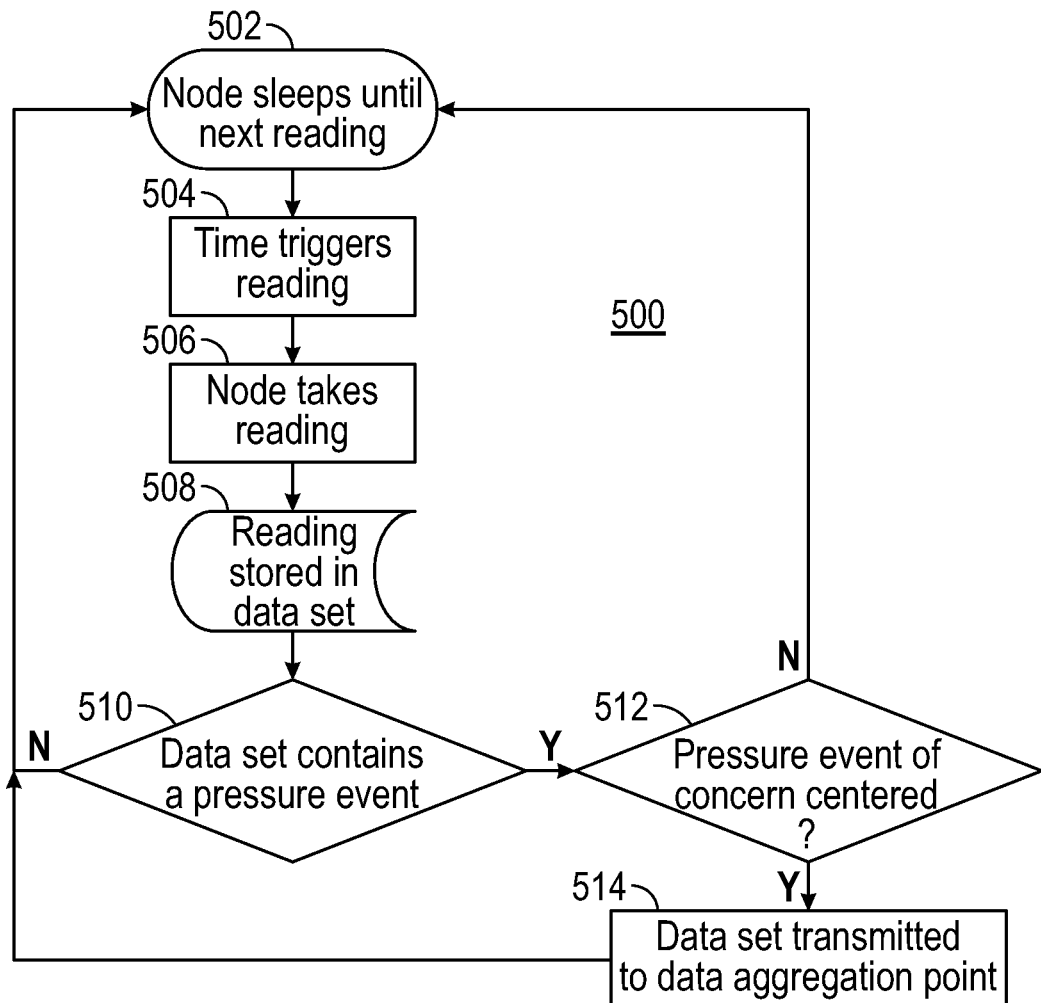
FIG. 5 is a flowchart depicting a method of data acquisition and analysis that takes place within the sensor node hardware of the pipeline leak detection apparatus according to a preferred embodiment.

FIG. 5 is a flowchart depicting the method of data acquisition and analysis that takes place within the sensor node hardware of the pipeline leak detection apparatus according to a preferred embodiment. FIG. 5 is a flowchart depicting a method 500 of utilizing a sensor node apparatus, which waits until the next scheduled reading 502 triggered by a synchronization means 504. Then the sensor node takes a measurement 506 and the measurement is stored in a data set 508. The measurement is then analyzed to determine whether a pressure event has occurred 510. In the event a pressure event has not occurred, the method returns to waiting until the next scheduled reading 502. On the other hand, if a pressure event has occurred, the method then determines whether the event is located, temporally, in the center of the data set 512. If the event is centered temporally in the data set, then the data set is transmitted to the data aggregation point 514 and the method returns to wait until the next scheduled reading 502, otherwise the method returns without transmitting the data set and waits until the next scheduled reading 502.

Method of Determining Location of Pressure Event (Potential Leak Signal)

Figure 6:
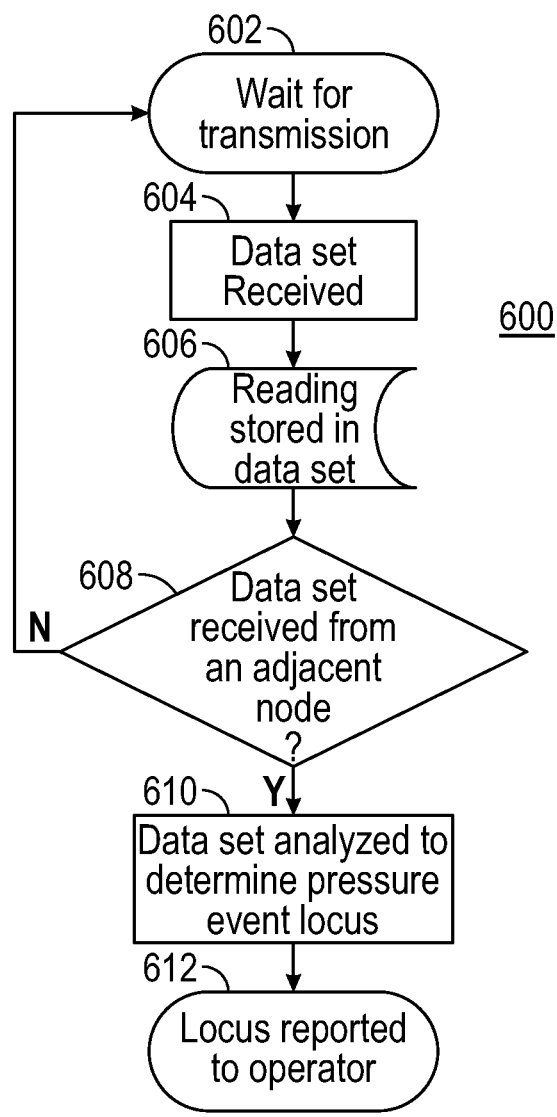
FIG. 6 is a flowchart depicting a method of data acquisition and analysis that takes place within the data aggregation point hardware of the pipeline leak detection apparatus according to a preferred embodiment.

FIG. 6 is a flowchart depicting the method of data acquisition and analysis that takes place within the data aggregation point hardware of the pipeline leak detection apparatus according to a preferred embodiment. FIG. 6 is a flowchart depicting a data aggregation point method 600 that waits for a sensor node transmission signal 602, then receives the data set 604. The data set is then stored in memory 606 (e.g., memory 1012). The sensor node transmission is then analyzed against previously stored data to determine whether data has been received from an adjacent sensor node 608. If there has not been data from an adjacent sensor node, then the data aggregation point returns and waits for another sensor node transmission signal 602. If, on the other hand, a data set was received from an adjacent sensor node, the method analyzes the information to determine the location of the pressure event 610. Subsequently, the location of the pressure event is reported to an operator/user 612.

Examples

Pipeline Leak Detection Apparatus Comprising Two Sensor Nodes

FIG. 7 is a diagram depicting a leak location between two sensor nodes. FIG. 7 depicts a segment of a pipeline network between two sensor nodes. A first sensor node 200 and a second sensor node 201 bound a sensing area. A leak, rupture, or other failure 720 occurs at some location between the first sensor node 200 and the second sensor node 201, creating a pressure/rarefaction wave traveling parallel 730 and counter-parallel 710.

Pipeline Leak Detection Apparatus Comprising Three Sensor Nodes

FIG. 8 is a diagram depicting an ambiguous leak location, one that places a pressure event at or around a sensor node. FIG. 8 depicts a two segments of a pipeline network comprising three sensor nodes: a first sensor node 200, a second sensor node 201, and a third sensor node 202. A leak, rupture, or other failure 720 occurs at some location near the second sensor node 201, creating a pressure/rarefaction wave traveling parallel 730 and counter-parallel 710.

Another Pipeline Leak Detection Apparatus Comprising Two Sensor Nodes

FIG. 9 is another diagram depicting a leak location between two sensor nodes and pressure waves propagating from the leak location. A first sensor node 200 and a second sensor node 201 bound a sensing area. A leak, rupture, or other failure 720 occurs at some location between the first sensor node 200 and the second sensor node 201, creating a pressure/rarefaction wave traveling parallel 730 and counter-parallel 710.

Pressure wave propagation has a number of advantages over other pipeline leak detection methods, as follows:

Provides rapid detection of a leak event.

Only needs a relatively small leak volume to detect a leak event.

Ability to pinpoint leak location with a good degree of accuracy, especially, when the leak location is between two sensor nodes.

However, pressure wave propagation also has a number of disadvantages when applied in its basic form:

Difficulty distinguishing leak events from normal background noise (e.g., false positive leak indications due to operation of normal pipeline hardware (e.g., pumps, valves).

Poor location accuracy due to difficulty in detecting time of leak initiation.

Poor location accuracy due to not calibrating the correct rate of pressure wave propagation.

Poor location accuracy due to not accounting for changes in rate of pressure wave propagation due to changes in fluid properties.

An alternative pipeline leak detection apparatus addresses these disadvantages, as discussed below.

Alternative Pipeline Leak Detection Apparatus Comprising Two Sensor Nodes

Figure 12:
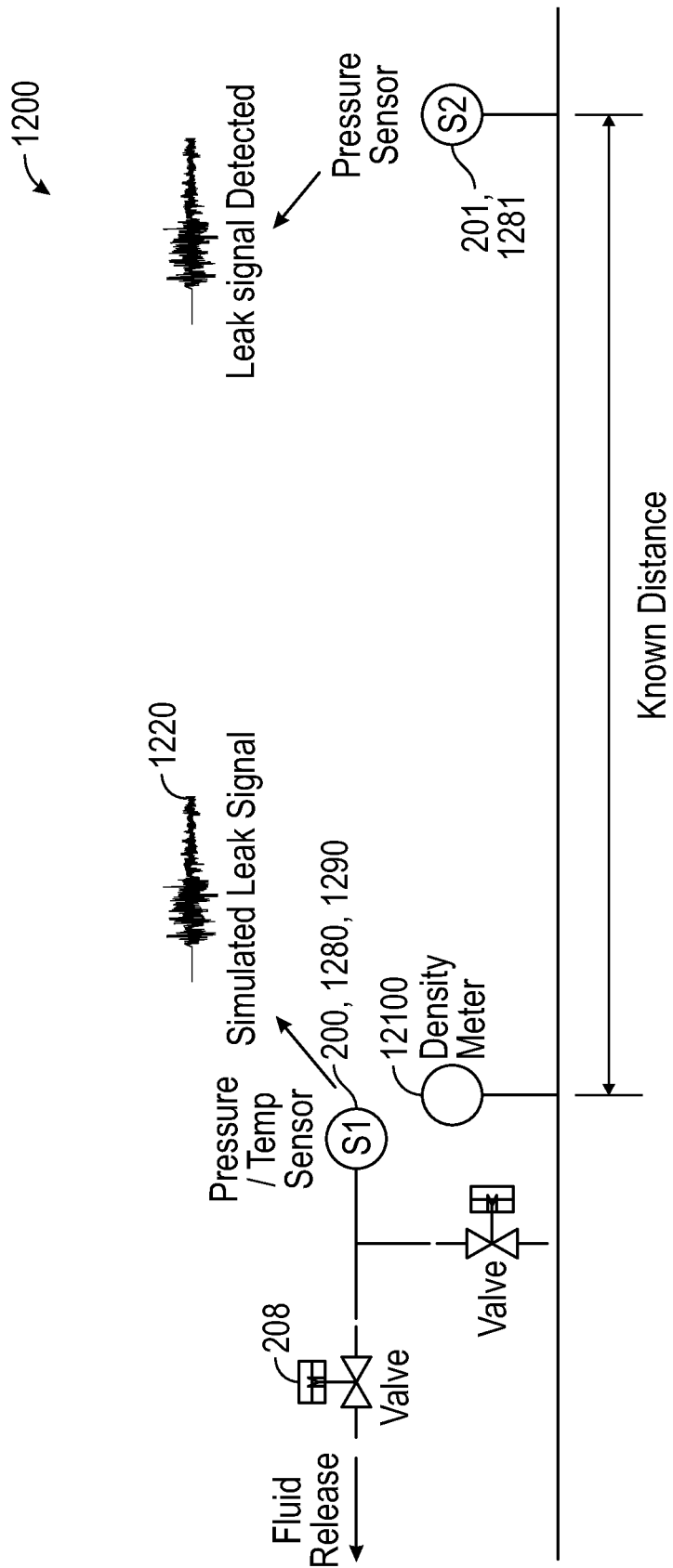
FIG. 12 is a diagram depicting a simulated leak signal from quick-release operation of a valve on a pipeline or pipeline network according to a preferred embodiment.

FIG. 12 is a diagram depicting a simulated leak signal from quick-release operation of a valve 208 on a pipeline or pipeline network according to a preferred embodiment. FIG. 12 depicts a segment of pipeline network between two sensor nodes. A first sensor node 200 and a second sensor node 201 bound a sensing area.

The first sensor node 200 is located at or near a valve 1270. The first sensor node 200 is located as close as possible to the valve 1270. The first sensor node 200 may be from about 0 meters to about 10 meters from the valve 1270, and any range or value there between. The first sensor node 200 may be about 2 meters from the valve 1270.

The first sensor node 200 has a first pressure sensing means (e.g., pressure sensor) 1280 and a first temperature sensing means (e.g., temperature sensor) 1290. The second sensor node 201 has a second pressure sensing means (e.g., pressure sensor) 1281. A density sensing means (e.g., density sensor) 12100 is located at or near the valve 1270 (and the first sensor node 200). The distance between the density sensing means (e.g., density sensor) 12100 and the second sensor node 201 is a known distance.

A quick-release operation of the valve 208 occurs at some location at or near the first sensor node 200, creating a simulated pressure/rarefaction wave (i.e., simulated leak signal) 1220 traveling parallel 730 and counter-parallel 710.

Alternative Pipeline Leak Detection Apparatus Comprising Three Sensor Nodes

Figure 13:
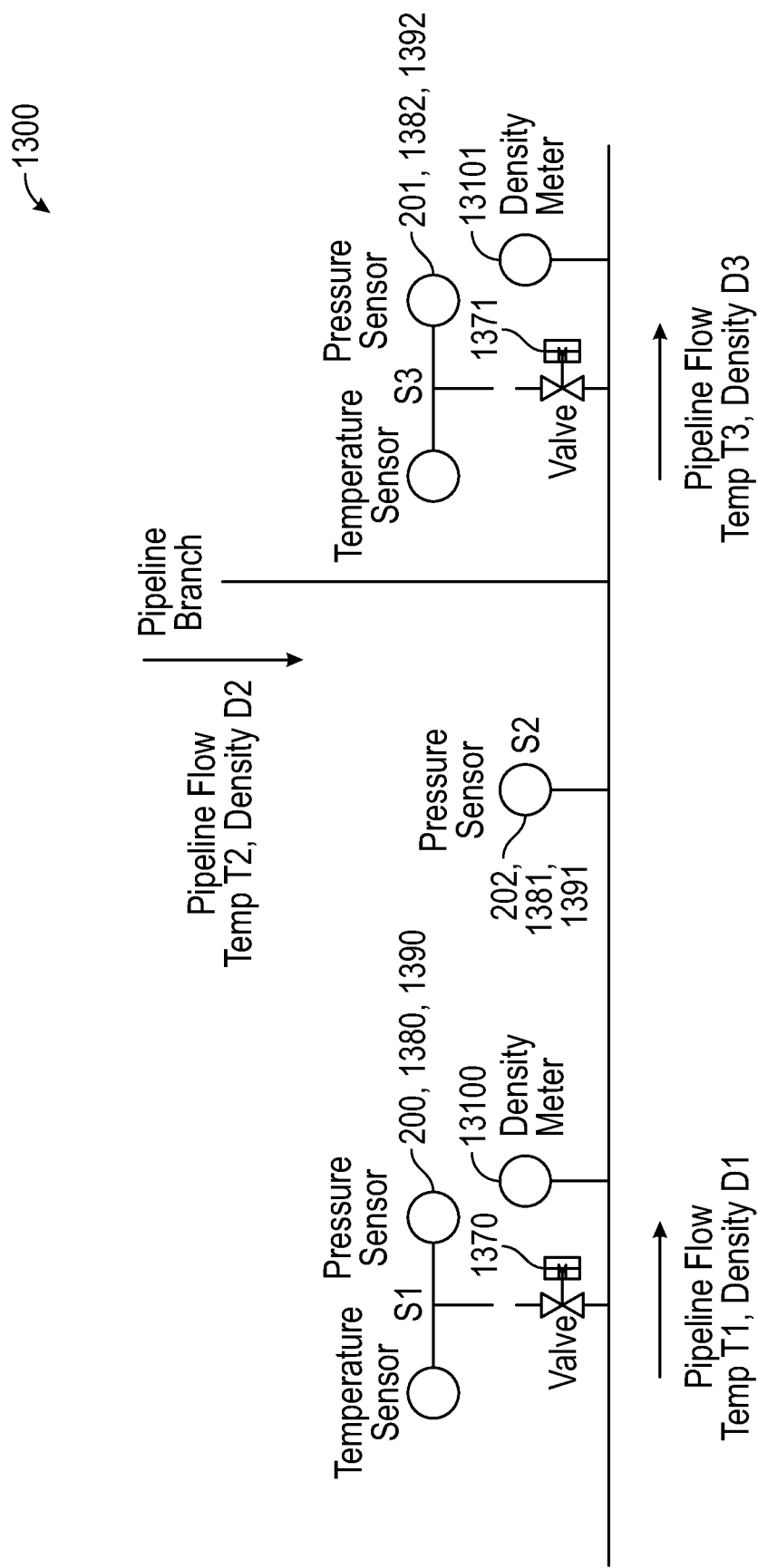
FIG. 13 is a diagram depicting exemplary sensor locations on a pipeline or pipeline network according to a preferred embodiment.

FIG. 13 is a diagram depicting exemplary sensor locations on a pipeline or pipeline network according to a preferred embodiment. FIG. 13 depicts a two segments of a pipeline network comprising three sensor nodes: a first sensor node 200, a second sensor node 201, and a third sensor node 202.

The first sensor node 200 is located at or near a first valve 1370. The first sensor node 200 is located as close as possible to the first valve 1370. The first sensor node 200 may be from about 0 meters to about 10 meters from the first valve 1370, and any range or value there between. The first sensor node 200 may be about 2 meters from the first valve 1370.

The first sensor node 200 has a first pressure sensing means (e.g., pressure sensor) 1380 and a first temperature sensing means (e.g., temperature sensor) 1390. A first density sensing means (e.g., density sensor) 13100 is located at or near the first valve 1370.

The second senor node 201 is located between the first valve 1370 (and first sensing node 200) and a branch of the pipeline network. The second sensor node 201 has a second pressure sensing means (e.g., pressure sensor) 1381 and an optional second temperature sensing means (e.g., temperature sensor) 1391.

The third sensor node 202 is located at or near a second valve 1371. The third sensor node 2020 has a third pressure sensing means (e.g., pressure sensor) 1382 and a third temperature sensing means (e.g., temperature sensor) 1392. A second density sensing means (e.g., density sensor) 13101 is located at or near the second valve 1371.

Figure 14:
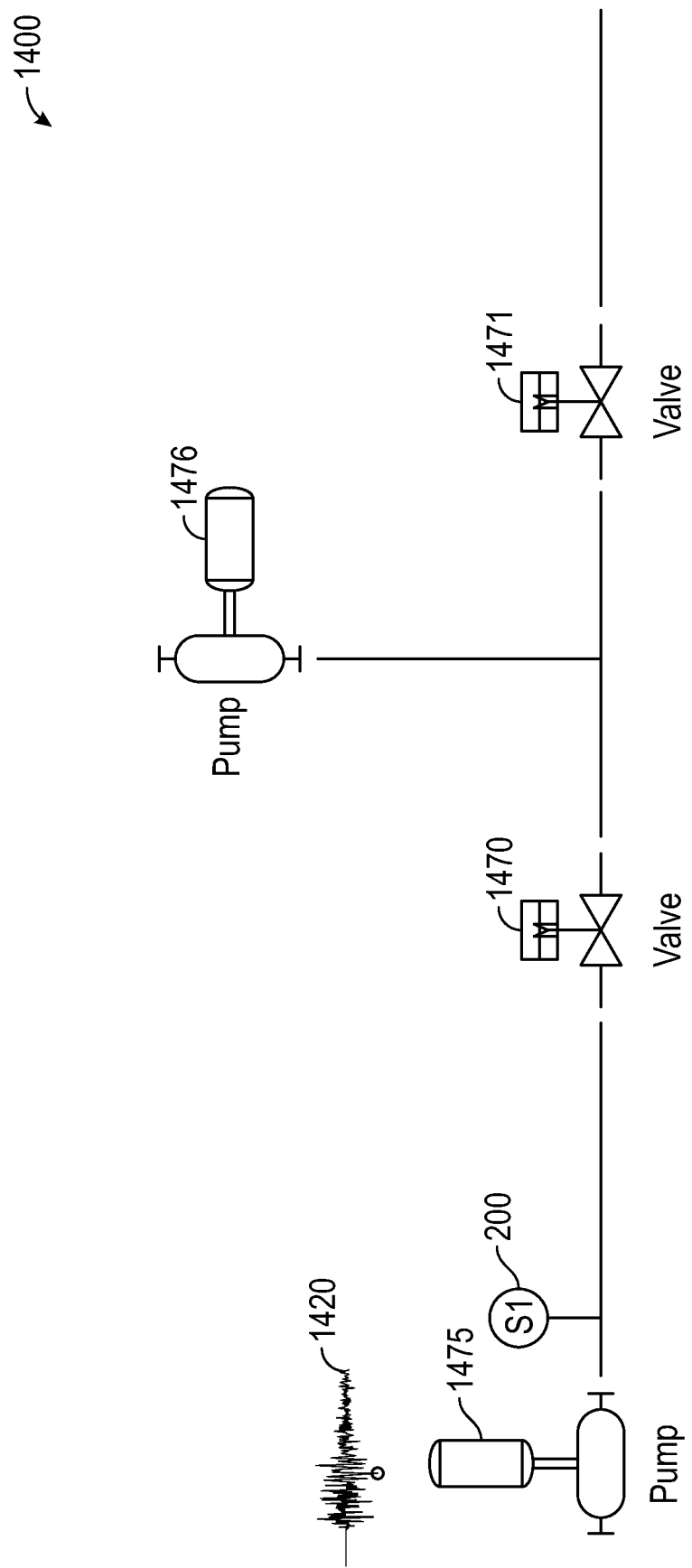
FIG. 14 is a diagram depicting a transient pressure event from normal operation of a pump on a pipeline.

FIG. 14 is a diagram depicting a transient pressure wave (pump noise signal) from a normal operation of a pump of the pipeline and a leak location between two sensor nodes. FIG. 14 depicts two segments of a pipeline network comprising two sensor nodes. A first sensor node 200 and a second sensor node 201 bound a sensing area. A leak, rupture, or other failure 720 occurs at some location between the first sensor node 200 and the second sensor node 201, creating a pressure/rarefaction wave traveling parallel 730 and counter-parallel 710. A normal operation of a pump of the pipeline at or near the first sensor node 200, also creating a transient pressure wave (pump noise) similar to the leak, rupture, or other failure 720.

Initial Calibration of Pipeline Leak Detection Apparatus

The location of a leak may be estimated by applying a cross-correlation method to a time difference at which the pressure sensing means (e.g., pressure sensors) detect the leak event. The cross-correlation method uses rate of propagation of the pressure wave (i.e., leak signal) within the pipeline.

Rate of Propagation Equation

The rate of propagation for the pressure wave within the pipeline is provided by the following equation:

$$a^2 = \frac{K}{\rho\left(1 + \frac{D}{e}\frac{K}{E}\Psi\right)}$$

Where a=sonic velocity (m/s)
D=internal diameter of pipeline (m)
K=Young's bulk modulus of fluid (N/m$^2$)
E=Young's modulus of pipeline material (N/m$^2$)
e=wall thickness of pipeline (m)
$\rho$=density of fluid (kg/m$^3$)=
$\Psi$=pipe support factor Selection of Pipe Support Factor FIG. 11A is a diagram depicting a pipeline PL having a first anchor A1 at an upstream and a valve V at a downstream end; FIG. 11B is a diagram depicting the pipeline PL for FIG. 11A having a second anchor A2 at the downstream end to prevent any axial movement; and FIG. 11C is a diagram depicting the pipeline PL of FIG. 11B having longitudinal expansion joints EJ1 and EJ2 along the pipeline PL to prevent longitudinal movement.

As shown in FIG. 11A and FIG. 19 (Table 1), when the pipeline is anchored at an upstream end with a first anchor A1 only, the pipe support factor is, as follows:

$$\Psi = [1/(1 + e/D)] \, [5/4 - u + 2(e/D) \, (1 + u) \, (1 + e/D)]$$

Where D=internal diameter of pipeline (m)
e=wall thickness of pipeline (m)
u=Poissons ratio
$\Psi$=pipe support factor As shown in FIGS. 11B and 19 (Table 1), when the pipeline PL is anchored at an upstream end with the first anchor A1 and at a downstream end with the second anchor A2 to prevent any axial movement, the pipe support factor is, as follows:

$$\Psi = [1/(1 + e/D)] \left[1 - u^2 + 2(e/D)(1 + u)(1 + e/D)\right]$$

Where D=internal diameter of pipeline (m)
e=wall thickness of pipeline (m)
u=Poissons ratio
Ψ=pipe support factor As shown in FIG. 11C and FIG. 19 (Table 1), when the pipeline PL is anchored at an upstream end with the first anchor A1 and at a downstream end with the second anchor A2 to prevent axial movement and has longitudinal expansion joints EJ1 and EJ2 to prevent longitudinal movement, the pipe support factor is, as follows:

$$\Psi = [1/(1 + e/D)] \left[1 + 2(e/D)(1 + u)(1 + e/D)\right]$$

Where D=internal diameter of pipeline (m)
e=wall thickness of pipeline (m)
u=Poissons ratio
Ψ=pipe support factor Temperature Correction Of the above-identified variables, the Young's bulk modulus of the fluid, fluid density of the fluid and Young's modulus of the pipeline are affected by changes in pressure and temperature of the fluid moving within the pipeline. Thus, they may be corrected for fluctuations in temperature.

As discussed above, a poor location accuracy may result from not calibrating the correct rate of pressure wave propagation. To overcome this disadvantage, measurements are taken of a rate of propagation of a pressure wave by opening a small bore valve and quickly releasing a small amount of fluid to create a pressure wave during an initial design, installation and set-up of the pipeline leak detection apparatus on the pipeline or pipeline network.

The pressure wave is detected by a first pressure sensing means (e.g., first pressure sensor) and a second pressure sensing means (e.g., second pressure sensor) at a known distance apart, providing an actual rate of propagation for the pressure wave.

Using one or more of a fluid density sensing means (e.g., fluid density sensors), a pressure sensing means (e.g., pressure sensors), a temperature sensing means (e.g., temperature sensors) to measure fluid properties (e.g., fluid density, pressure, temperature) of the pipeline, an initial calibration point may be generated for sonic velocity. See also equation above.

FIG. 12 is a diagram depicting a simulated leak signal from quick-release operation of a valve 208 on a pipeline or pipeline network according to a preferred embodiment. FIG. 12 depicts a segment of pipeline network between two sensor nodes. A first sensor node 200 and a second sensor node 201 bound a sensing area.

The first sensor node 200 is located at or near a valve 1270. The first sensor node 200 is located at or near a valve 1270. The first sensor node 200 is located as close as possible to the valve 1270. The first sensor node 200 may be from about 0 meters to about 10 meters from the valve 1270, and any range or value there between. The first sensor node 200 may be about 2 meters from the valve 1270.

The first sensor node 200 has a first pressure sensing means (e.g., pressure sensor) 1280 and a first temperature sensing means (e.g., temperature sensor) 1290.

The second sensor node 201 has a second pressure sensing means (e.g., pressure sensor) 1281. A density sensing means (e.g., density sensor) 12100 is located at or near the valve 1270 (and the first sensor node 200). The distance between the first pressure sensing means (e.g., pressure sensor) 1280 and/or the density sensing means (e.g., density sensor) 12100 and the second sensor node 201 is a known distance.

The known distance between the first pressure sensing means 1280 (and/or the density sensing means (e.g., density sensor) 12100) and the second pressure sensing means (e.g., pressure sensor) 1281 is used during the initial calibration process.

This known distance is the maximum distance in which the simulated leak signal may still be detected. The distance at which a leak signal may be detected depends on a number of variables (e.g., such as pipeline pressure, fluid density, minimum detectable leak size).

A quick-release operation of the valve 208 occurs at some location at or near the first sensor node 200, creating a simulated/pressure/rarefaction wave (i.e., simulated leak signal) 1220 traveling parallel 730 and counter-parallel 710.

The simulated/pressure/rarefaction wave (i.e., simulated leak signal) is created at or near the first sensor node 200 (e.g., first pressure sensing means 1280) and detected at the second sensor node 201 (e.g., second pressure sensing means 1281).

A time difference is measured using the first sensor node 200 (e.g., first pressure sensing means 1280) and the second sensor node 201 (e.g., second pressure sensing means 1281).

An actual rate of propagation (e.g., distance between pressure sensing means/time difference) may be calculated for the simulated pressure/rarefaction wave (i.e., simulated leak signal).

A density of the fluid is measured using a density sensing means (e.g., fluid density sensors) 12100.

An initial calibration point for sonic velocity may be calculated for the apparatus 1200. See also equation above.

Continuous Re-Calibration of Pipeline Leak Detection Apparatus

As discussed above, a poor location accuracy may result from not accounting for changes in rate of propagation of the pressure wave due to changes in the fluid properties.

To overcome this disadvantage, the same pressure sensing means (e.g., pressure sensors) and other sensing means (e.g., fluid density sensors, temperature sensors) that were used in the initial calibration of the pipeline leak detection apparatus are used in the operation of the apparatus.

FIG. 13 is a diagram depicting exemplary sensor locations on a pipeline or pipeline network according to a preferred embodiment. FIG. 13 depicts a two segments of a pipeline network comprising three sensor nodes: a first sensor node 200, a second sensor node 201, and a third sensor node 202.

The first sensor node 200 is located at or near a first valve 1370. The first sensor node 200 is located as close as possible to the first valve 1370. The first sensor node 200 may be from about 0 meters to about 10 meters from the first valves 1370, and any range or value there between. The first sensor node 200 may be about 2 meters from the first valve 1370.

The first sensor node 200 has a first pressure sensing means (e.g., first pressure sensor) 1380 and a first temperature sensing means (e.g., first temperature sensor) 1390. A first density sensing means (e.g., first density sensor) 13100 is located at or near the first valve 1370.

The second senor node 201 is located between the first valve 1370 (and first sensing node 200) and a branch of the pipeline network. The second sensor node 201 has a second pressure sensing means (e.g., second pressure sensor) 1381 and an optional second temperature sensing means (e.g., second temperature sensor) 1391. The distance between the first pressure sensing means (e.g., first pressure sensor) 1380 (and/or the first density sensing means (e.g., first density sensor) 13100) and the second sensor node 201 is a known distance.

The third sensor node 202 is located at or near a second valve 1371. The third sensor node 2020 has a third pressure sensing means (e.g., third pressure sensor) 1382 and a third temperature sensing means (e.g., third temperature sensor) 1392. A second density sensing means (e.g., second density sensor) 13101 is located at or near the second valve 1371.

The known distance between the first pressure sensing means (e.g., first pressure sensor) 1380 (and/or the first density sensing means (e.g., first density sensor) 13100) and the second pressure sensing means (e.g., second pressure sensor) 1381 is used during the re-calibration process.

This known distance is the maximum distance in which the leak signal may still be detected. The maximum distance at which a leak signal can be detected depends on a number of variables (e.g., pipeline pressure, fluid density, minimum detectable leak size).

A time difference is measured using the first sensor node 200 (e.g., first pressure sensing means 1380) and the second sensor node 201 (e.g., second pressure sensing means 1381).

A rate of propagation (e.g., distance between pressure sensing means/time difference) may be calculated for the rarefaction/pressure wave (i.e., leak signal).

The placement of temperature and fluid density sensors depends on a number of variables (e.g., temperature of pipeline fluid, density of pipeline fluid). For pipeline flow where these variables are relatively unchanged along the length of pipeline, only one set of temperature and density sensors may be used. See FIG. 12. For a pipeline where the temperature of the pipeline fluid and/or the density varies due to either natural cooling of the pipeline contents or introduction of fluids at other pipeline branches causing variation, multiple temperature and fluid density sensors would need to be used. See FIG. 13.

Further, the fluid properties of the pipeline may be continuously measured using the pressure sensing means (e.g., pressure sensors), the temperature sensing means (e.g., temperature sensor), and the density sensing means (e.g., density sensors) to generate an corrected/updated calibration point for sonic velocity for measuring pipeline fluid flow parameters, providing a more accurate reference rate of propagation for the pressure wave. See also equation above. This more accurate reference rate of propagation of the pressure wave results in a more accurate leak location.

A first density of the fluid is measured using a first density sensing means (e.g., first density sensor) 13100; and a second density of the fluid is measured using a second density sensing means (e.g., second density sensor) 13101.

A first temperature of the fluid is measured using a first temperature sensing means (e.g., first temperature sensor) 1390; a second temperature may be measured using an optional second temperature sensing means (e.g., second temperature sensor) 1391; and a third temperature may be measured using a third temperature sensing means (e.g., third temperatures sensor) 1392.

A re-calibration point for sonic velocity may be calculated for the apparatus 1300. See also equation above.

Quasi-Active Noise Cancelation

FIG. 14 is a diagram depicting a transient pressure event from normal operation of a pump on a pipeline. FIG. 14 depicts a segment of a pipeline network comprising two pumps and two valves.

A first pump 1475 is located on the pipeline network. A first valve 1470 and a second valve 1471 are also located on the pipeline network. A second pump 1476 is located on a branch of the pipeline network between the first valve 1470 and the second valve 1471.

If a sensor node 200 were located on the pipeline network at or near the first pump 1475, a normal operation of the first pump 1475 would create a false-positive rarefaction wave (i.e., pump noise signal) 1420 traveling parallel 730 and counter-parallel 710.

As discussed above, false positive leak indications due to operation of normal pipeline hardware (e.g., pumps, valves) may result from a difficulty distinguishing leak events from normal background noise.

During normal operation of the pipeline, transient pressure events are created by the operation of normal pipeline hardware (e.g., pumps, valves). These transient pressure events propagate along the pipeline in the same way as a pressure event generated by a leak (e.g., potential leak signal) and may be mistaken by the pipeline leak detection apparatus as a leak events due to their transient nature.

To overcome these false positive leak indications, the pressure sensing means (e.g., pressure sensors) and pipeline leak detection apparatus are placed at or near the location of this normal pipeline hardware (e.g., pumps, valves).

Accordingly, the transient pressure events (e.g. pump noise signal, valve noise signal) emitted during operation of the normal pipeline hardware (e.g., pumps, valves) may be captured at the same relative time as the pressure wave of a suspected leak event is detected by the apparatus distributed along the pipeline.

Figure 15:
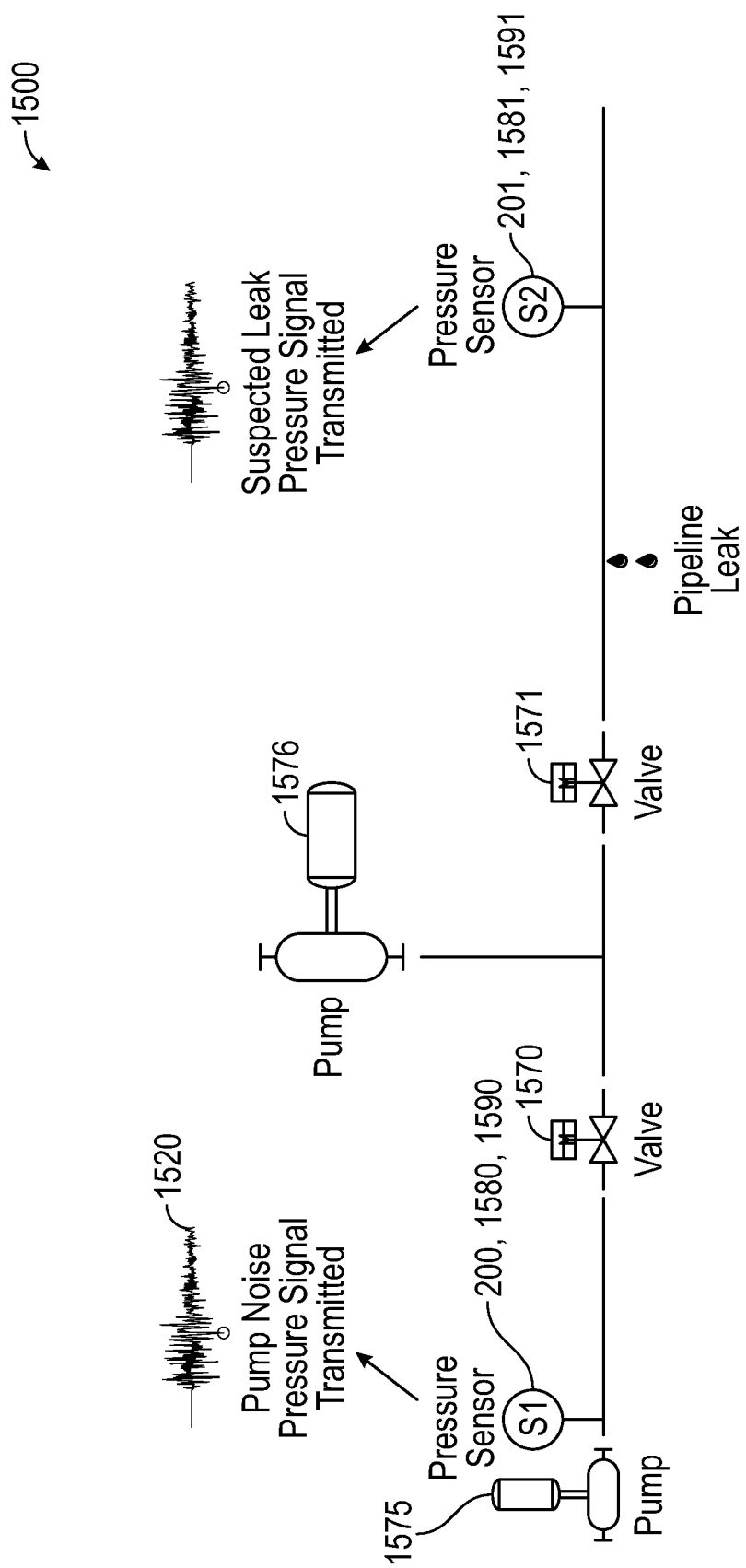
FIG. 15 is a diagram depicting a transient pressure event from normal operation of a pump on a pipeline and a leak location between to sensor nodes.

FIG. 15 is a diagram depicting a transient pressure event from normal operation of a pump on a pipeline and a leak location between to sensor nodes. FIG. 15 depicts a segment of pipeline network having two sensor nodes: a first sensor node 200 and a second sensor node 201. The pipeline networks also has two pumps and two valves.

A first pump 1575 is located on the pipeline network. A first valve 1570 and a second valve 1571 are also located on the pipeline network. A second pump 1576 is located on a branch of the pipeline network between the first valve 1570 and the second valve 1571.

The first sensor node 200 is located at or near a first pump 1575. The first sensor node 200 is located as close as possible to the first pump 1576. The first sensor node 200 may be from about 0 meters to about 10 meters from the first pump 1575, and any range or value there between. The first sensor node 200 may be about 2 meters from the first pump 1575.

The first sensor node 200 has a first pressure sensing means (e.g., pressure sensor) 1580 and an optional first temperature sensing means (e.g., temperature sensor) 1590.

The second sensor node 201 has a second pressure sensing means (e.g., pressure sensor) 1581 and an optional second temperature sensing means (e.g., temperature sensor) 1591. The distance between the first pressure sensing means (e.g., pressure sensor) 1580 and the second sensor node 201 is a known distance.

A normal operation of the first pump 1575 occurs at some at or near the first sensor node 200, creating a false-positive rarefaction wave (i.e., pump noise signal) 1520 traveling parallel 730 and counter-parallel 710.

The false-positive rarefaction wave (i.e., pump noise signal) is created at or near the first sensor node 200 (e.g., first pressure sensing means 1250) and detected at the second sensor node 201 (e.g., second pressure sensing means 1581).

The time stamped pressure data collected by the pipeline leak detection apparatus located at both the pipeline hardware (e.g., pumps, valves) and at locations along the main body of the pipeline is transmitted to a computing device 1000 where a pipeline pressure wave is compared to a suspected leak pressure wave (e.g., suspected leak pressure signal) for a least difference best fit.

The fitting of the signals may be accomplished by processing the data from time to frequency domain using a variety of transforms. The most commonly used transforms for this process are Fourier Transform, Z transform and Wavelet transform.

The pipeline hardware pressure noise signal is inverted and added to the pipeline pressure signal to cancel out as much of the pipeline hardware pressure (e.g., pump noise, valve noise) noise as possible. This comparison and inversion will cancel out the pipeline hardware pressure noise (e.g., pump noise, valve noise) leaving either background pipeline pressure noise (i.e., normal operation of pump or valve) or a clean pressure signal (i.e., confirmed leak event).

Thus, the apparatus is less likely to trigger a false positive leak indication due to operation of normal pipeline hardware (e.g., pumps, valves).

Methods of Calibrating and Using Alternative Pipeline Leak Detection Apparatus

Method of Calibrating Alternative Pipeline Leak Detection Apparatus

Figure 16:
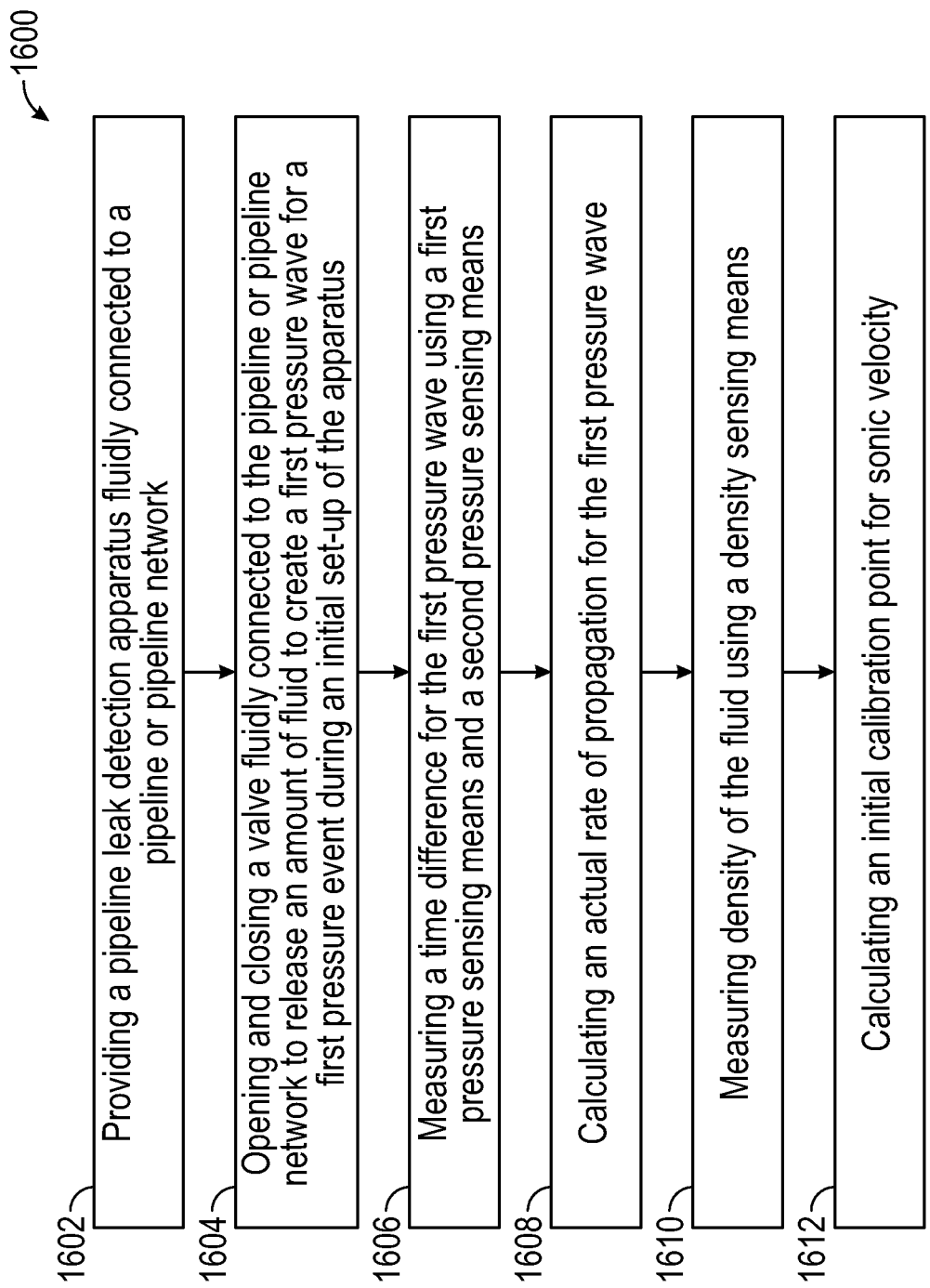
FIG. 16 is a flowchart depicting a method of calibration of the pipeline leak detection apparatus according to a preferred embodiment.

FIG. 16 is a flowchart depicting the method of calibrating the pipeline leak detection apparatus according to a preferred embodiment. FIG. 16 is a flowchart depicting a method of utilizing the pipeline leak detection apparatus 1600, which provides an initial calibration of the apparatus. The method 1600 may include providing a pipeline leak detection apparatus as discussed herein fluidly connected to a pipeline or pipeline network 1602; opening and closing a valve fluidly connected to the pipeline or pipeline network to release an amount of fluid to create a first pressure wave during an initial set-up of the apparatus 1604; measuring a time difference for a first pressure wave using a first pressure sensing means (e.g., first pressure sensor) and a second pressure sensing means (e.g., second pressure sensor) 1606; and calculating an actual rate of propagation (e.g., distance between pressure sensing means/time difference) for the pressure wave 1608.

The valve may be a ball valve. The valve may be a bleed-off valve. The valve may be a quarter turn valve. The valve may be a small bore valve. The valve may be opened and closed quickly to release a small amount of the fluid.

The pressure sensing means (e.g., pressure sensors) should be a known distance apart. The pressure wave moves between the pressure sensing means (e.g., pressure sensors) during a measured time difference.

The method 1600 may further include measuring density of the fluid using a density sensing means (e.g., fluid density sensors) 1610 and calculating an initial calibration point for sonic velocity 1612.

Method of Re-Calibrating Alternative Pipeline Leak Detection Apparatus

Figure 17A:
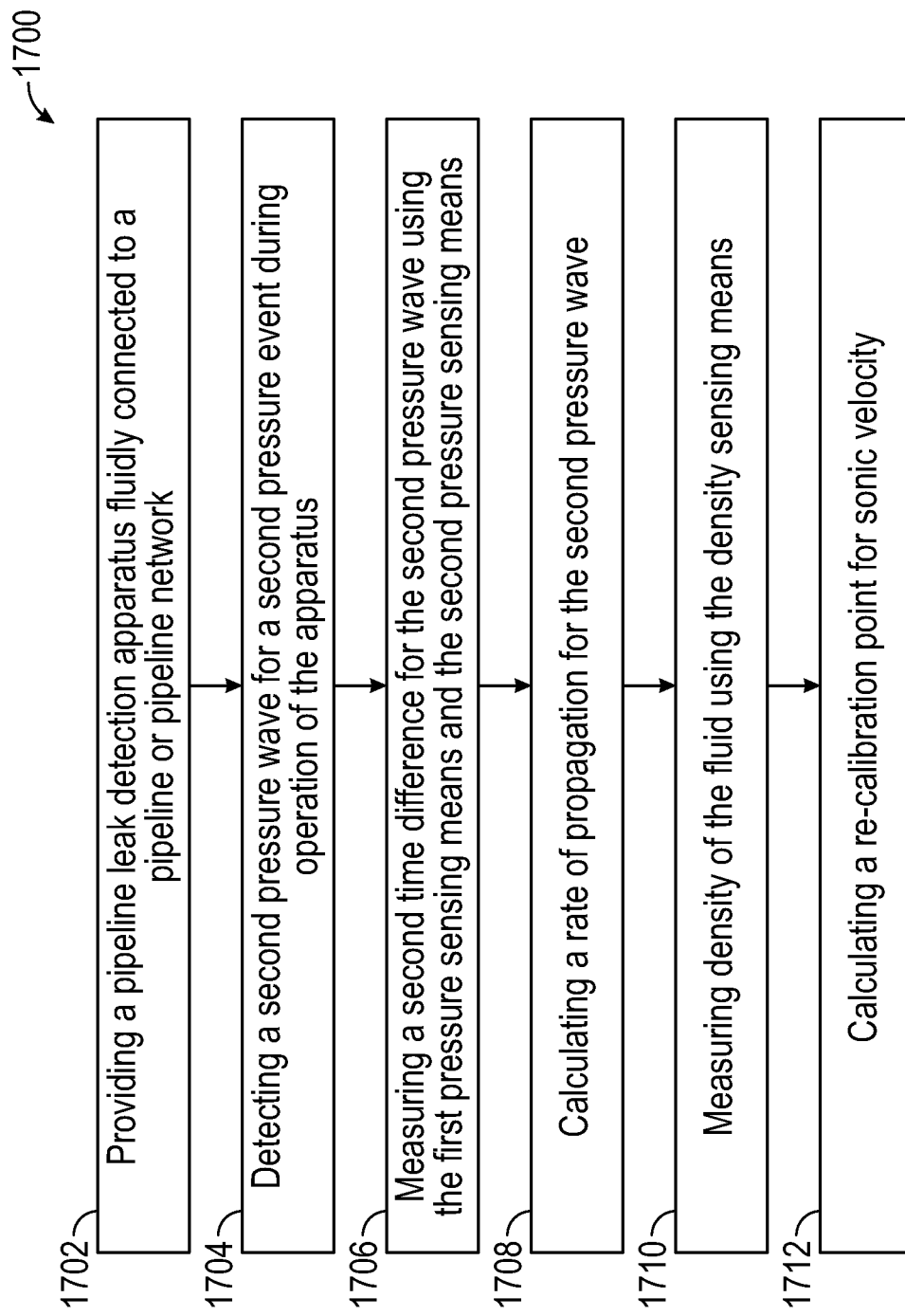
FIG. 17A is a flowchart depicting a method of re-calibration of the pipeline leak detection apparatus according to a preferred embodiment.
Figure 17B:
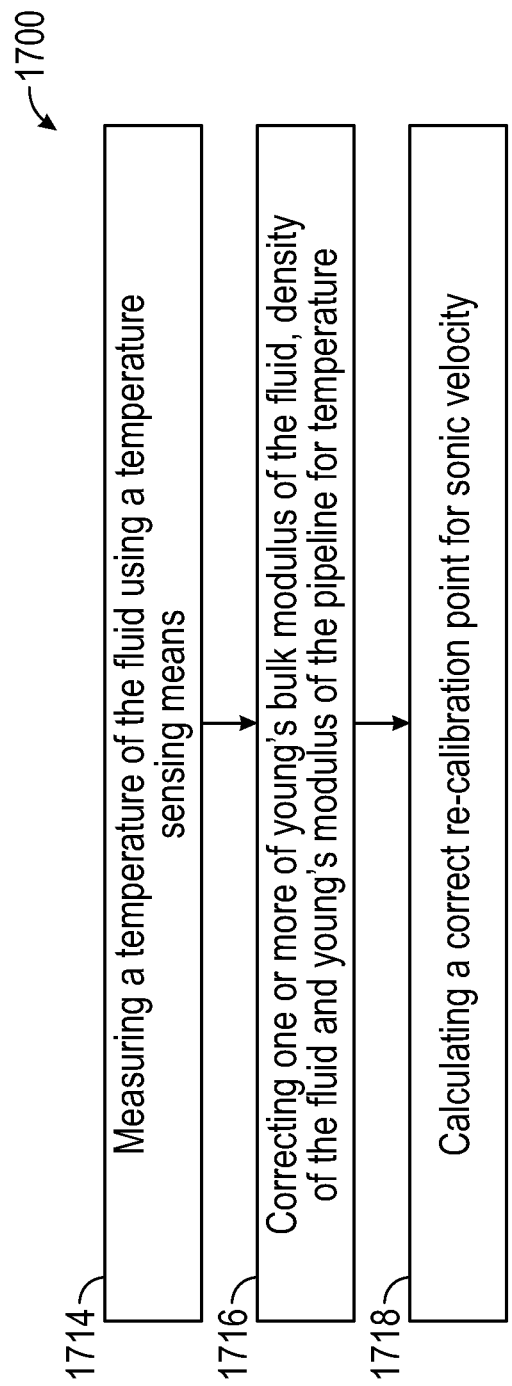
FIG. 17B is a flowchart depicting the method of FIG. 17A, showing additional steps for the method.

FIG. 17A is a flowchart depicting a method of re-calibration of the pipeline leak detection apparatus according to a preferred embodiment; and FIG. 17B is a flowchart depicting the method of FIG. 17A, showing additional steps for the method.

FIG. 17A is a flowchart depicting a method of utilizing the pipeline leak detection apparatus 1700, which provides a method for re-calibration of the apparatus. The method 1700 may include providing the pipeline leak detection apparatus fluidly connected to a pipeline or pipeline network 1702; detecting a second pressure wave during operation of the apparatus 1704; measuring a second time difference for the second pressure wave using the pressure sensing means (e.g., first pressure sensor) and the second pressure sensing means (e.g., second pressure sensor) 1706; and calculating a rate of propagation (e.g., distance/time difference) for the second pressure wave 1708.

The method 1700 may further include measuring density of the fluid using density sensing means (e.g., fluid density sensors) 1710; and calculating a re-calibration point for sonic velocity 1712.

One or more of the fluid density sensing means (e.g., density sensors) and the pressure sensing means (e.g., pressure sensors) may be the same as those used in the initial set-up of the apparatus.

One or more of the density sensing means (e.g., density sensors) and the pressure sensing means (e.g., pressure sensors) may be continuously monitored to provide an updated re-calibration point for sonic velocity.

One or more of the density sensing means (e.g., density sensor) and the pressure sensing means (e.g., pressure sensor) may be periodically monitored to provide an updated re-calibration point for sonic velocity. One or more of the density sensing means (e.g., density sensors) and the pressure sensing means (e.g., pressure sensors) may be periodically monitored as triggered by a synchronization means to provide an updated re-calibration point for sonic velocity.

FIG. 17B is a flowchart depicting a method of utilizing the pipeline leak detection apparatus 1700, which provides additional steps for re-calibration of the apparatus. The method 1700 may further include measuring temperature of the fluid using a temperature sensing means (e.g., temperature sensors) 1714; correcting one or more of Young's bulk modulus of the fluid, density of the fluid and Young's modulus of the pipeline for changes in temperature of the fluid 1716, and calculating a corrected re-calibration point for sonic velocity 1718.

One or more of the fluid density sensing means (e.g., fluid density sensors), pressure sensing means (e.g., pressure sensors) and temperature sensing means (e.g., temperature sensors) may be the same as those used in the initial set-up of the apparatus.

One or more of the density sensing means (e.g., density sensors), the pressure sensing means (e.g., pressure sensors) and the temperature sensing means (e.g., temperatures sensors) may be continuously monitored to provide an updated corrected re-calibration point for sonic velocity.

One or more of the density sensing means (e.g., density sensors), the pressure sensing means (e.g., pressure sensors) and the temperature sensing means (e.g., temperature sensors) may be periodically monitored to provide an updated corrected re-calibration point for sonic velocity. One or more of the density sensing means (e.g., density sensors), the pressure sensing means (e.g., pressure sensors) and the temperature sensing means (e.g., temperature sensors) may be periodically monitored as triggered by a synchronization means to provide an updated corrected re-calibration point for sonic velocity.

Methods of Determining Occurrence of and Location of Pressure Event (Potential Leak Signal)

Figure 18A:
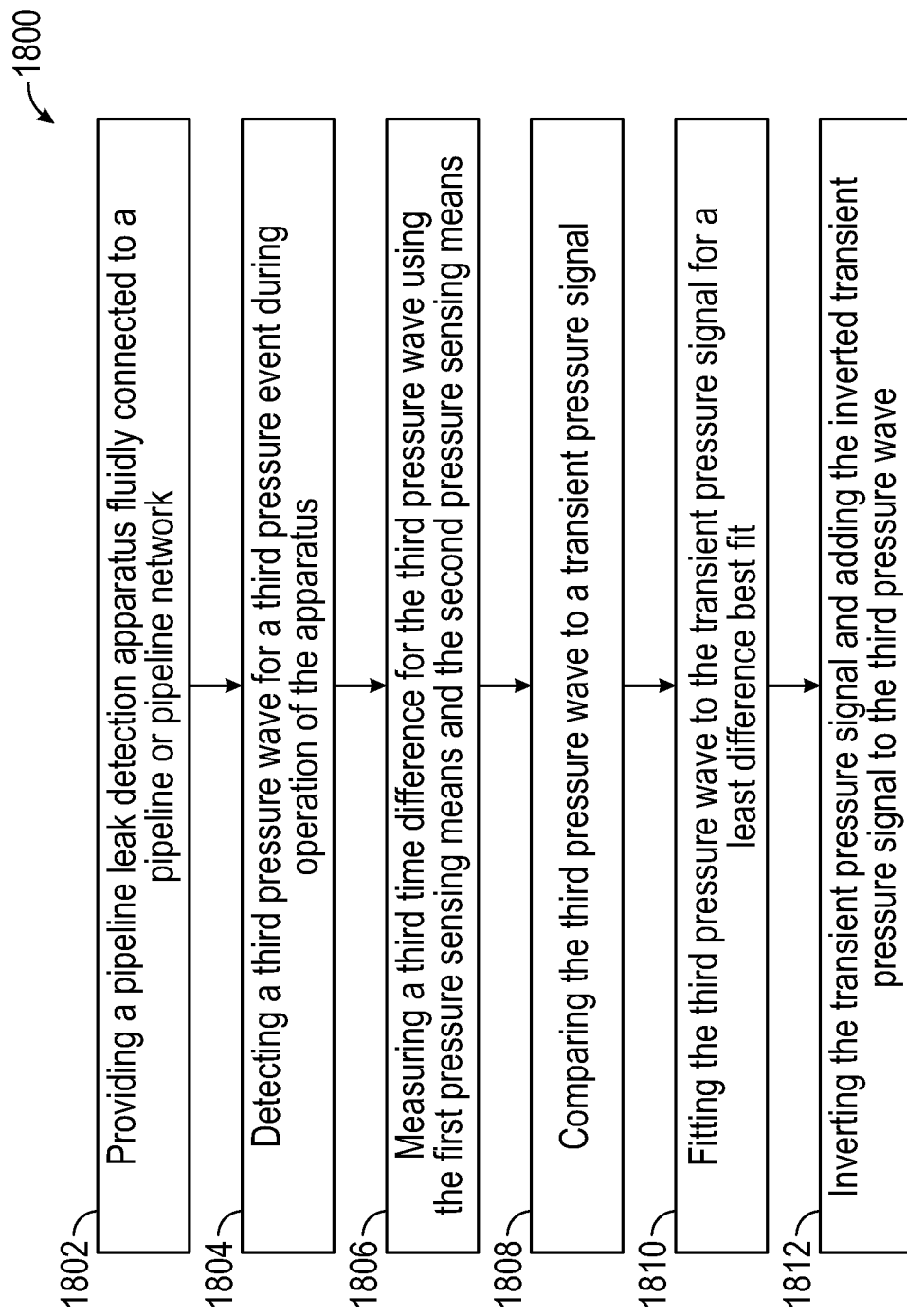
FIG. 18A is a flowchart depicting a method of data acquisition and analysis of the pipeline leak detection apparatus to determine occurrence of a pressure event according to a preferred embodiment.
Figure 18B:
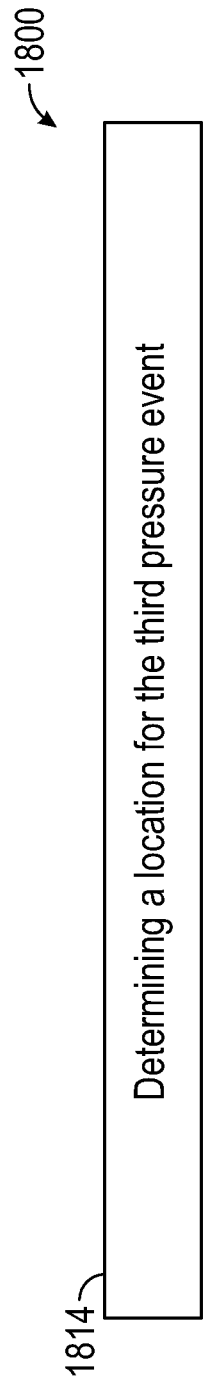
FIG. 18B is a flowchart depicting a method of data acquisition and analysis of the pipeline leak detection apparatus to determine location of the pressure event according to a preferred embodiment.
Figure 18C:
FIG. 18C is a flowchart depicting the method of FIG. 18B, showing additional steps for the method.

FIG. 18A is a flowchart depicting a method of data acquisition and analysis of the pipeline leak detection apparatus to determine occurrence of a pressure event according to a preferred embodiment; FIG. 18B is a flowchart depicting a method of data acquisition and analysis of the pipeline leak detection apparatus to determine location of the pressure event according to a preferred embodiment; and FIG. 18C is a flowchart depicting the method of FIG. 18B, showing additional steps for the method.

FIG. 18A is a flowchart depicting a method of determining an occurrence of a pressure event. The method 1800 may include providing the pipeline leak detection apparatus fluidly connected to a pipeline or pipeline network 1802; detecting a third pressure wave during operation of the pipeline leak detection apparatus 1804; measuring a third time difference for the third pressure wave using the first pressure sensing means and the second pressure sensing means 1806; comparing the third pressure wave to a transient pressure signal (e.g., pump noise, valve noise) 1808; fitting the third pressure wave to the transient pressure signal (e.g., pump noise, valve noise) using a Fourier transform, a Z transform or a Wavelet transform 1810; and inverting the transient pressure wave (e.g., pump noise, valve noise) and adding the inverted transient pressure wave to the third pressure wave 1812.

The pipeline hardware pressure noise signal is inverted and added to the pipeline pressure signal to cancel out as much of the pipeline hardware pressure (e.g., pump noise, valve noise) noise as possible. This comparison and inversion will cancel out the pipeline hardware pressure noise (e.g., pump noise, valve noise) leaving either background pipeline pressure noise (i.e., normal operation of pump or valve) or a clean pressure signal (i.e., confirmed leak event).

Thus, the apparatus is less likely to trigger a false positive leak indication due to operation of normal pipeline hardware (e.g., pumps, valves).

FIG. 18B is a flowchart depicting a method of data acquisition and analysis of the pipeline leak detection apparatus to determine location of the pressure event according to a preferred embodiment; and FIG. 18C is a flowchart depicting the method of FIG. 18B, showing additional steps for the method.

FIG. 18B is a flowchart depicting a method of utilizing the pipeline leak detection apparatus 1800, which provides a method of data acquisition and analysis of the pipeline leak detection apparatus to determine location of the pressure event. The method 1800 may include determining a location for the pressure event 1814.

The data set may be stored in one or more of a data aggregation point memory, sensor node memory, a computing device memory and a cloud-based memory.

The method 1800 may further include reporting the location of the pressure event to an operator/user 1816.

The location of the pressure event is reported to an operator/user via an user interface.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Definitions

As used herein, the terms "a," "an," "the," and "said" means one or more, unless the context dictates otherwise.

As used herein, the term "about" means the stated value plus or minus a margin of error, or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

The invention claimed is:

1. A pipeline leak detection apparatus for detection and location of a leak in a pipeline, the apparatus comprising:
  a first pressure sensing means fluidly connected to the pipeline, wherein the first pressure sensing means is located at or near a pump or a valve of the pipeline;
  a second pressure sensing means fluidly connected to the pipeline, wherein the second pressure sensing means is a known distance from the first pressure sensing means;
  a processor means, wherein the first pressure sensing means is communicatively connected to the processor means and wherein the second pressure sensing means is communicatively connected to the processor means;
  a memory storage means operatively coupled to the processor means;
  instructions stored in the memory storage means and executable by the processor means to instruct the apparatus to:
  open and close a valve to release an amount of fluid to create a first pressure wave for a first pressure event during an initial set-up of the apparatus;

measure a first time difference for the first pressure wave using the first pressure sensing means and the second pressure sensing means;

calculate an actual rate of propagation for the first pressure wave using the processor means;

detect a second pressure wave for a second pressure event during operation of the apparatus;

measure a second time difference for the second pressure wave using the first pressure sensing means and the second pressure sensing means;

calculate a rate of propagation for the second pressure wave using the processor means;

measure density of the fluid using the density sensing means; and calculate a re-calibration point for sonic velocity.

2. The apparatus of claim 1, wherein the instructions comprise further instructions to instruct the apparatus to:

measure density of the fluid using a density sensing means; and calculate an initial calibration point for sonic velocity using the processor means.

3. The apparatus of claim 1, wherein the instructions comprise further instructions to instruct the apparatus to:

store the initial calibration point for sonic velocity to the memory storage means.

4. The apparatus of claim 1, wherein the valve is a ball valve, a bleed-off valve, a quarter turn valve or a small bore valve.

5. The apparatus of claim 1, wherein the instructions comprise further instructions to instruct the apparatus to:

store the re-calibration point for sonic velocity to the memory storage means.

6. The apparatus of claim 1, wherein the instructions comprise further instructions to instruct the apparatus to:

measure temperature of the fluid using a temperature sensing means;

correct one or more of Young's bulk modulus of the fluid, density of the fluid, and Young's modulus of the pipeline for temperature; and calculate a corrected re-calibration point for sonic velocity.

7. The apparatus of claim 6, wherein the instructions comprise further instructions to instruct the apparatus to:

store the corrected re-calibration point for sonic velocity to the memory storage means.

8. The apparatus of claim 1, wherein the instructions comprise further instructions to instruct the apparatus to:

detect a third pressure wave for a third pressure event during operation of the apparatus;

measure a third time difference for the third pressure wave using the first pressure sensing means and the second pressure sensing means;

compare the third pressure wave to a transient pressure signal for a pump operation and/or a valve operations;

fit the third pressure wave to the transient pressure signal using a least difference best fit; and invert the transient pressure signal and add the inverted transient pressure signal to the third pressure wave to obtain background noise or clean pressure wave.

9. The apparatus of claim 8, wherein the instructions comprise further instructions to instruct the apparatus to:

determine a location for the third pressure event.

10. The apparatus of claim 9, wherein the instructions comprise further instructions to instruct the apparatus to:

report the location for the third pressure event to an operator.

11. A method of calibrating a pipeline leak detection apparatus, the method comprising:

opening and closing the valve to release the amount of fluid to create the first pressure wave for the first pressure event during the initial set-up of the apparatus of claim 1;

measuring the time difference for the first pressure wave using the first pressure sensing means and the second pressure sensing means; and calculating the actual rate of propagation for the first pressure wave.

12. The method of claim 11 further comprising:

measuring the first density of the fluid using the density sensing means; and calculating the initial calibration point for sonic velocity.

13. The method of claim 12 further comprising:

detecting the second pressure wave for the second pressure event during operation of the apparatus;

measuring the second time difference for the second pressure wave using the first pressure sensing means and the second pressure sensing means;

calculating the rate of propagation for the second pressure wave;

measuring the second density of the fluid using the density sensing means; and calculating the re-calibration point for sonic velocity.

14. The method of claim 13 further comprising:

storing the re-calibration point for sonic velocity to the memory storage means.

15. The method of claim 13, wherein one or more of the density sensing means, the first pressure sensing means and the second pressure sensing means are the same as those used in the initial set-up of the apparatus.

16. The method of claim 13 further comprising:

measuring temperature of the fluid using a temperature sensing means;

correcting one or more of Young's bulk modulus of the fluid, density of the fluid, and Young's modulus of the pipeline for temperature; and calculating a corrected re-calibration point for sonic velocity.

17. The method of claim 15 further comprising:

storing the corrected re-calibration point for sonic velocity to the memory storage means.

18. The method of claim 16, wherein one or more of the density sensing means, the first pressure sensing means and the second pressure sensing means are the same as those used in the initial set-up of the apparatus.

19. The method of claim 12 further comprising:

detecting a third pressure wave for a third pressure event during operation of the apparatus;

measuring a third time difference for the third pressure wave using the first pressure sensing means and the second pressure sensing means;

comparing the third pressure wave to a transient pressure signal for a pump operation and/or a valve operations;

fitting the third pressure wave to the transient pressure signal using a least difference best fit; and inverting the transient pressure signal and add the inverted transient pressure signal to the third pressure wave to obtain background noise or clean pressure wave.

20. The method of claim 19 further comprising:

determining a location for the third pressure event along the pipeline.

21. The method of claim 19 further comprising:

reporting the location of the third pressure event to a user via an user interface.

22. The apparatus of claim 6, wherein the instructions comprise further instructions to instruct the apparatus to:
- detect a third pressure wave for a third pressure event during operation of the apparatus;
- measure a third time difference for the third pressure wave using the first pressure sensing means and the second pressure sensing means;
- compare the third pressure wave to a transient pressure signal for a pump operation and/or a valve operations;
- fit the third pressure wave to the transient pressure signal using a least difference best fit;
- invert the transient pressure signal and add the inverted transient pressure signal to the third pressure wave to obtain background noise or clean pressure wave; and
- determine a location for the third pressure event.

23. The method of claim 16 further comprising:
- detecting a third pressure wave for a third pressure event during operation of the apparatus;
- measuring a third time difference for the third pressure wave using the first pressure sensing means and the second pressure sensing means;
- comparing the third pressure wave to a transient pressure signal for a pump operation and/or a valve operations;
- fitting the third pressure wave to the transient pressure signal using a least difference best fit;
- inverting the transient pressure signal and add the inverted transient pressure signal to the third pressure wave to obtain background noise or clean pressure wave; and
- determining a location for the third pressure event along the pipeline.

* * * * *